(12) United States Patent
Gebara et al.

(10) Patent No.: US 11,599,393 B2
(45) Date of Patent: Mar. 7, 2023

(54) GUARANTEED QUALITY OF SERVICE IN CLOUD COMPUTING ENVIRONMENTS

(71) Applicant: State Street Corporation, Boston, MA (US)

(72) Inventors: Fadi Gebara, Boston, MA (US); Ram Rajamony, Boston, MA (US); Ahmed Gheith, Boston, MA (US)

(73) Assignee: State Street Corporation, Boston, MA (US)

( * ) Notice: Subject to any disclaimer, the term of this patent is extended or adjusted under 35 U.S.C. 154(b) by 0 days.

(21) Appl. No.: 17/700,980

(22) Filed: Mar. 22, 2022

(65) Prior Publication Data

US 2022/0283860 A1   Sep. 8, 2022

Related U.S. Application Data

(63) Continuation of application No. 16/385,442, filed on Apr. 16, 2019.

(Continued)

(51) Int. Cl.
*G06F 9/50* (2006.01)
*G06F 9/48* (2006.01)
(Continued)

(52) U.S. Cl.
CPC ............ *G06F 9/505* (2013.01); *G06F 9/4881* (2013.01); *G06N 20/00* (2019.01); *G06Q 40/04* (2013.01); *H04L 41/5003* (2013.01); *H04L 67/10* (2013.01); *H04L 67/60* (2022.05); *G06F 16/22* (2019.01)

(58) Field of Classification Search
CPC ........ G06F 9/505; G06F 9/4881; G06F 16/22; G06N 20/00; H04L 67/60; H04L 41/5003; H04L 67/10; G06Q 40/04
See application file for complete search history.

(56) References Cited

U.S. PATENT DOCUMENTS

2005/0165925 A1\* 7/2005 Dan ................... H04L 67/1025
709/224
2005/0226251 A1\* 10/2005 Krzanowski ............ H04L 47/70
370/395.41

(Continued)

*Primary Examiner* — Meng Ai T An
*Assistant Examiner* — Willy W Huaracha
(74) *Attorney, Agent, or Firm* — Goodwin Procter LLP

(57) ABSTRACT

Systems, methods, apparatuses, and computer-readable media for guaranteed quality of service (QoS) in cloud computing environments. A workload related to an immutable log describing a transaction may be received. A determination is made based on the immutable log that a first compute node stores at least one data element to process the transaction. Utilization levels of computing resources of the first compute node may be determined. Utilization levels of links connecting the first compute node to the fabric may be determined. A determination may be made, based on the utilization levels, that processing the workload on the first compute node satisfies one or more QoS parameters specified in a service level agreement (SLA). The workload may be scheduled for processing on the first compute node based on the determination that processing the workload on the first compute node satisfies the one or more QoS parameters specified in the SLA.

15 Claims, 14 Drawing Sheets

Related U.S. Application Data

(60) Provisional application No. 62/663,477, filed on Apr. 27, 2018, provisional application No. 62/658,060, filed on Apr. 16, 2018.

(51) Int. Cl.
  *G06Q 40/04* (2012.01)
  *H04L 67/10* (2022.01)
  *H04L 41/5003* (2022.01)
  *G06N 20/00* (2019.01)
  *H04L 67/60* (2022.01)
  *G06F 16/22* (2019.01)

(56) References Cited

U.S. PATENT DOCUMENTS

| | | | |
|---|---|---|---|
| 2016/0085587 A1* | 3/2016 | Dube | G06F 9/4881 |
| | | | 718/104 |
| 2016/0321751 A1* | 11/2016 | Creighton, IV | G06Q 40/04 |
| 2017/0052823 A1* | 2/2017 | Hu | G06F 9/5016 |
| 2017/0346760 A1* | 11/2017 | Kelly | H04L 47/805 |

* cited by examiner

GUARANTEED QUALITY OF SERVICE IN CLOUD COMPUTING ENVIRONMENTS

CROSS-REFERENCE TO RELATED APPLICATIONS

This application is a continuation of U.S. application Ser. No. 16/385,442, filed Apr. 16, 2019, now abandoned, which claims the benefit of U.S. Provisional Application No. 62/658,060, filed Apr. 16, 2018, and of U.S. Provisional Application No. 62/663,477, filed Apr. 27, 2018. The aforementioned applications are incorporated by reference herein in their entireties.

TECHNICAL FIELD

Embodiments herein generally relate to cloud computing, and more specifically, to providing guaranteed quality of service in cloud computing environments.

BACKGROUND

Cloud computing services generally provide computing resources to a plurality of different customers. One challenge to cloud computing providers is the ability to ensure that Quality of Service (QoS) offered to customers meets guaranteed levels of QoS (e.g., in a service level agreement). Often, the vast amount of data flowing through the cloud computing environment poses significant challenges to delivering QoS.

SUMMARY

Embodiments disclosed herein provide systems, methods, articles of manufacture, and computer-readable media for guaranteed quality of service (QoS) in cloud computing environments. A workload comprising an immutable log describing a transaction may be received. A determination is made based on the immutable log that a first compute node stores at least one data element to process the transaction. Utilization levels of computing resources of the first compute node may be determined. Utilization levels of links connecting the first compute node to the fabric may be determined. A determination may be made, based on the utilization levels, that processing the workload on the first compute node satisfies one or more QoS parameters specified in a service level agreement (SLA). The workload may be scheduled for processing on the first compute node based on the determination that processing the workload on the first compute node satisfies the one or more QoS parameters specified in the SLA.

DETAILED DESCRIPTION

Embodiments disclosed herein provide techniques to support predictable quality of service (QoS) guarantees in cloud computing platforms. Massive amounts of data may be stored in a mass storage system using a hierarchy of caches to provide predictable performance. Performance may be defined using service level agreements (SLAs) which provide for a predictable amount of jitter. Embodiments disclosed herein may provide predictable performance using a non-blocking matrix switch that enables the transfer of large amounts of data with guaranteed jitter and predictability (as may be defined in the SLAs).

Programs may operate against the data, which may be stored using a flat model that is broken into small workloads that can be divided between the various hardware compute nodes. Because of the massive amount of data that can be stored, ongoing and/or recurring calculations, such as generating monthly financial statements, can be calculated based on the totality of data rather than persisting intermediary reports (e.g., using October end-of-month statements as the starting point for November operations). Some calculations may be made with limited accuracy, such that a user can request an answer within a short period of time (e.g., one second), at a certain accuracy (e.g., 99%), or both at a very high cost.

Generally, a workload to be processed may be received by the cloud computing platform which includes a plurality of hardware compute nodes communicably coupled via a fabric. The workload may be related to an immutable log for one or more transactions. A scheduler may determine where to place the workload for processing based on one or more heuristics that will meet the parameters defined by the SLA. For example, if a first compute node stores data needed to process the workload, the scheduler may determine to place the workload on the first compute node. As another example, if the first compute node is not suitable to accept the workload (e.g., because the computing resources of the first compute node are being utilized to process other workloads), the scheduler may place the workload on a second compute node that is proximate to the first compute node, thereby facilitating faster access to the needed data that is stored on the first compute node. As yet another example, if the communications link between the first and second compute nodes is saturated (and/or used at a level that exceeds a utilization threshold), the scheduler may place the workload on a third compute node that is proximate to the first compute node, where the communications link between the first and third compute nodes is not overutilized. Doing so allows the workload to be processed in a manner which satisfies the guarantees specified in the SLA.

Figure 1:
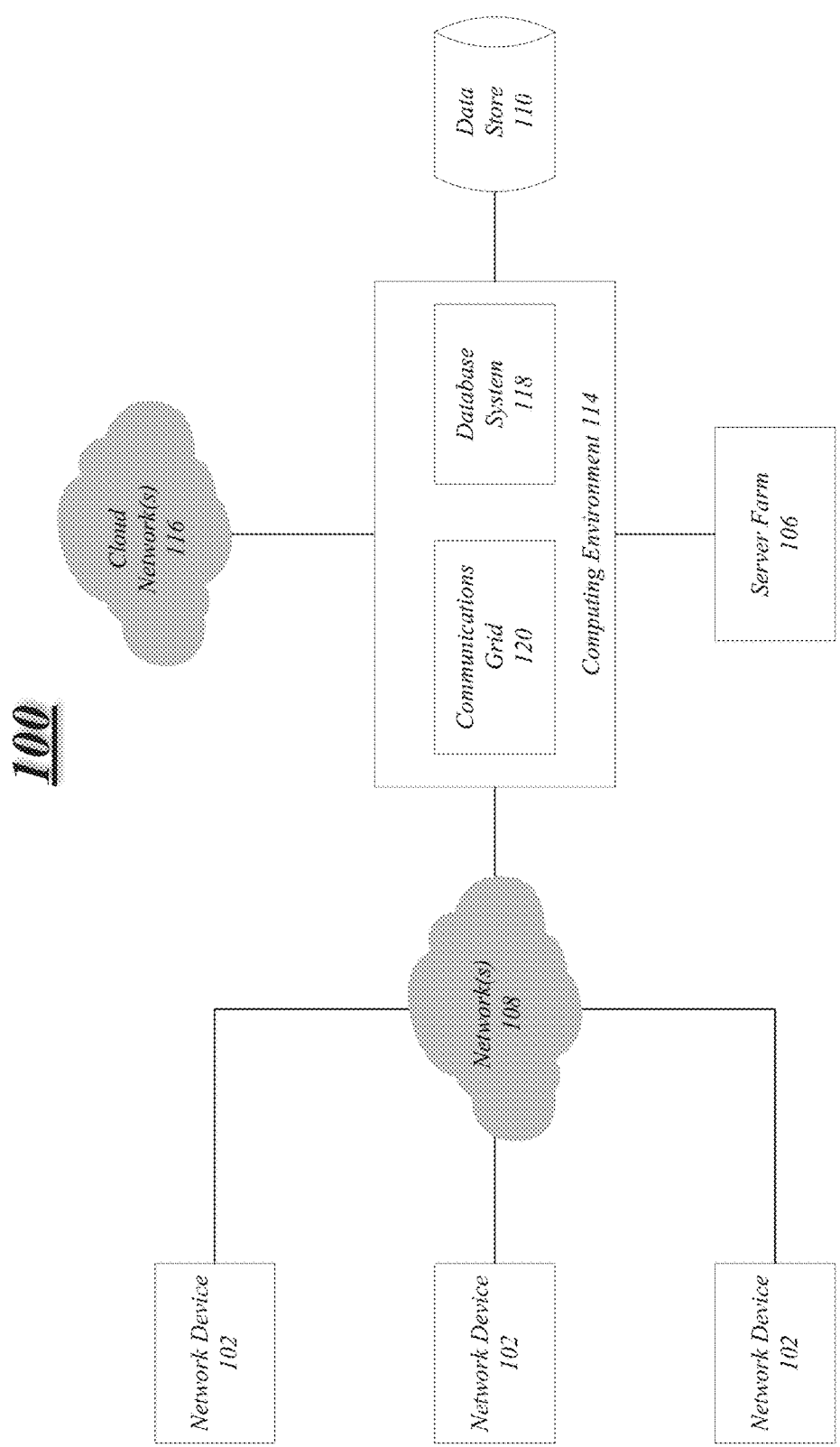
FIG. 1 depicts hardware components of a data transmission network.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that are capable of communicating with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

In other embodiments, network devices 102 may provide a large amount of data, either all at once or streaming over a period of time to the computing environment 114 via networks 108. For example, network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices themselves. Network devices 102 may also include sensors that monitor their environment or other devices to collect data regarding that environment or those devices, and such network devices 102 may provide data they collect over time. Network devices 102 may also include devices within the internet of things (IoT), such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
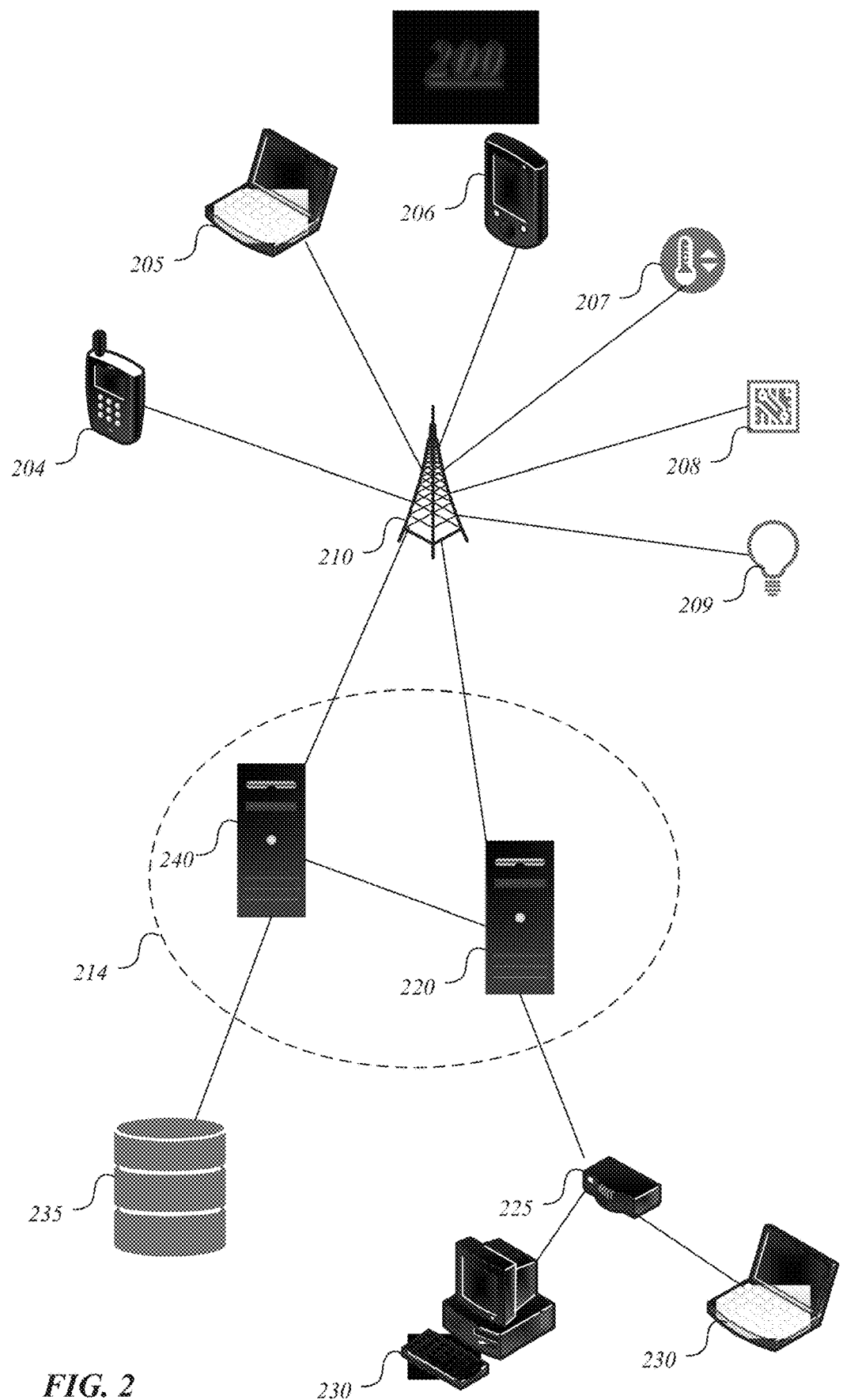
FIG. 2 depicts an example network including an example set of devices communicating with each other over an exchange system.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., a financial operation). The network devices may detect and record data related to the environment that it monitors, and transmit that data to computing environment 214.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 202 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 214, or before deciding whether to transmit data to the computing environment 214. For example, network devices may determine whether data collected meets certain rules, for example by comparing data or values computed from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a machine 240, such as a web server. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
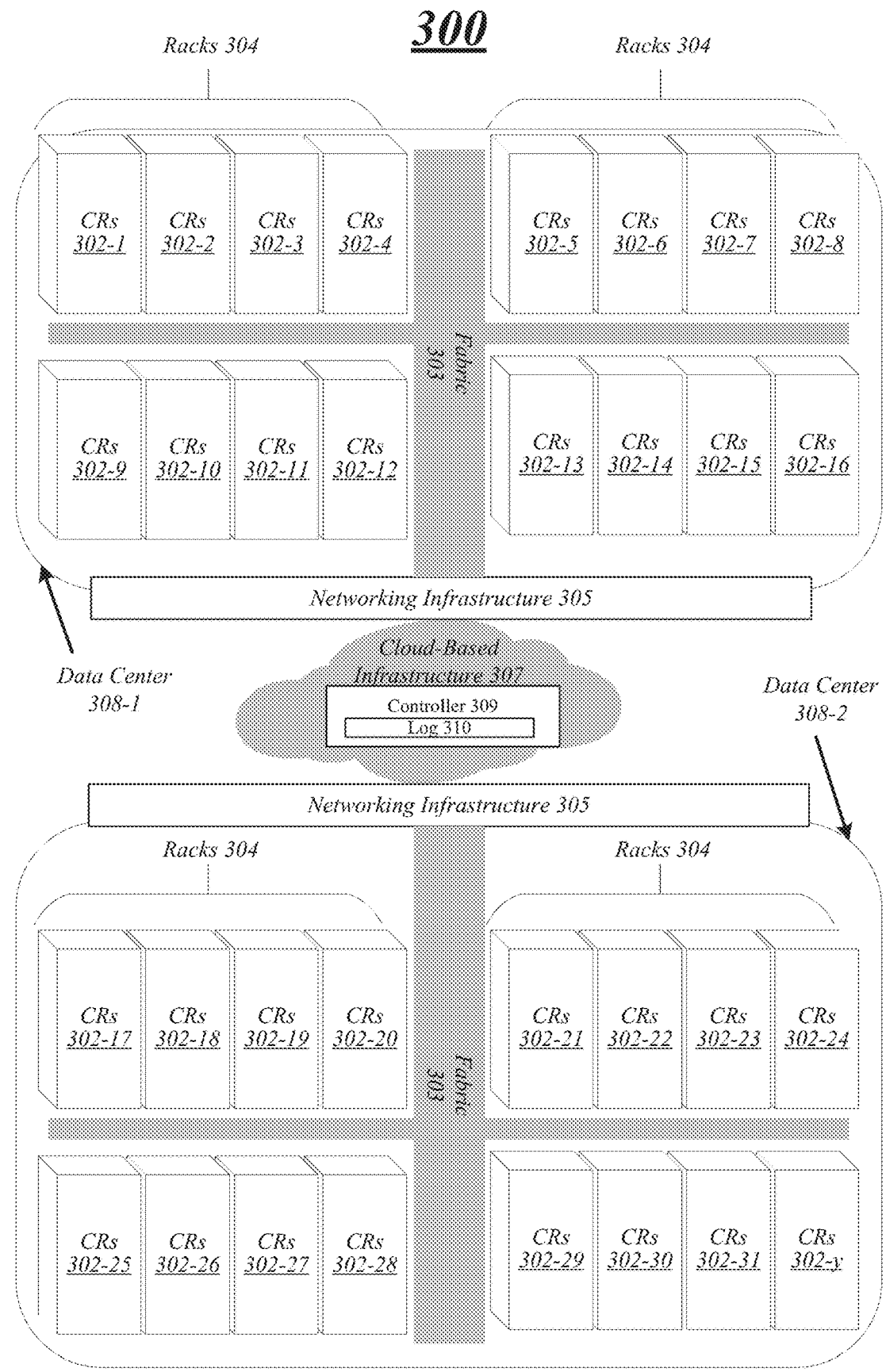
FIG. 3 illustrates an embodiment of an example system.

FIG. 3 illustrates a conceptual overview of a system 300 that may generally be representative of a distributed cloud-based computing system or another type of computing network in that one or more techniques described herein may be implemented according to various embodiments. As shown in FIG. 3, system 300 may generally include computing resources (CRs) 302-$y$, where y is any positive integer, to compute information and data. The computing resources 302 may include resources of multiple types, such as—for example—processors, co-processors, fully-programmable gate arrays (FPGAs), memory, networking equipment, circuit boards, storage, and other computing equipment. The embodiments are not limited to these examples.

The computing resources 302 may be included as part of a computer, such as a server, server farm, blade server, a server sled, or any other type of server or computing device, and may be within one or more racks 304. In embodiments, the racks 304 may be part of one or more data centers 308 and may be coupled with each other via various networking equipment. For example, the racks 304 within a data center 308 may be coupled with each via a fabric 303. The fabric 303 may include a combination of electrical and/or optical signaling media, and high bandwidth interconnects, such as Gigabit Ethernet, 10 Gigabit Ethernet, 100 Gigabit Ethernet, InfiniBand, Peripheral Component Interconnect (PCI) Express (PCIe), and so forth. Further, the fabric 303 may include switching infrastructure, such as switches, routers, gateways, and so forth. The fabric 303 is configured such that any rack 304 may send signals to (and receive signals from) each other racks 304 within a data center 308 to communicate data and information. In embodiments, the fabric 303 may be coupled with networking infrastructure 305 such that it enables communication of signals between racks of one data center 308 with racks 304 of another data center 308 to communicate data and information. For example, FIG. 3 illustrates racks 304 of data center 308-1 coupled with racks 304 of data center 308-2 via fabrics 303, networking infrastructure 305, and the cloud-based infrastructure 307. The cloud-based infrastructure 307 illustratively includes a cloud controller 309. Although depicted as a component of the cloud-based infrastructure 307, the fabrics 303, racks 304, networking infrastructure 305, and data centers 308 may each include an instance of the controller 309. The controller 309 may comprise software, hardware, and/or a combination of software and hardware.

In embodiments, the networking infrastructure 305 includes networking equipment, such as routers, firewalls, switches, gateways, cabling, and so forth to communicate data and information between a data center 308 and with the cloud-based infrastructure 307 and another data center 308. For example, the networking infrastructure 305 may include edge access routers, edge access switches, and edge firewalls capable of communicating with core routers, core switches, and core firewalls of the cloud-based infrastructure 307. The core networking equipment of the cloud-based infrastructure 307 may couple with edge networking equipment of another data center 308 to enable communication between data centers 308. Note that embodiments are not limited in this manner, and the networking infrastructure 305 and/or cloud-based infrastructure 307 may include other networking equipment, servers, relays, interconnects, and so forth to enable communication between a data center 308 and other data centers 308.

In one example, the system 300 may be a distributed cloud-based computing system to provide a financial service platform. The system 300 may process data and information, such as financial data and financial information, to provide financial services, for example. The financial services include, but are not limited to, investment and asset management services, active equity management services, active quantitative equity services, cash fund services, alternatives services, currency management services, index investing services, electronic trading services, multi-asset services, investment research services, investment trading services, accounting services, custody services, fund administration services, outsourcing services, performance measurement services, portfolio analysis services, data analytics services, investment analytics services, benchmark/indices/indicator services, D-as-a-Service (DaaS) services, and so forth. Embodiments are not limited to these examples. To provide these financial services, the controller 309 may dynamically pool or compose a plurality of the computing resources 302 together within a data center 308 and/or among data centers 308 in the cloud via the cloud-based infrastructure 307. In one example, computing resources 302 of data center 308-1 may be composed with computing resources 302 of data center 308-2 to process data and information, e.g., a workload, to provide a financial service. Once the workload completes, the controller 309 may decompose the composed computing resources 302 and make the computing resources 302 available to process another workload. Note that in embodiments, the system 300 may enable multiple instances of pooled or composed computing resources 302 to provide data and information processing in parallel and embodiments are not limited in this manner.

In embodiments, system 300 may be coupled with one or more other systems, such as investment trading systems, banking systems, regulatory systems, risk management systems, performance systems, accounting system, data warehouse systems, financial institution system, and so forth. These other systems may be coupled with system 300 via networking, such as the networking infrastructure 305 and the cloud-based infrastructure. Embodiments are not limited in this manner.

The controller 309 may be used to provide access to resources in the system 300. For example, the controller 309 may control access to the fabrics 303, racks 304, networking infrastructure 305, and data centers 308. Furthermore, when a workload is received for processing in the system 300, the controller 309 may select one or more computing resources 302 to process the workload. For example, a workload may be defined by one or more entries in an immutable log. The immutable log may store data that are related to one or more transactions to be processed by the system 300. For example, the immutable log may specify an account identifier of an account, an asset (e.g., a stock, ETF, mutual fund, etc.) identifier subject to the transaction, a transaction type (e.g., buy, sell, etc.), and any other data describing the transaction. To process the transaction, the system 300 may generally need to determine the current price of the asset, process the transaction according to the determined price, update the account balances, and update the position holdings of the account in the asset.

The system 300 may process transactions according to one or more service level agreements (SLAs). The SLAs may define quality of service (QoS) parameters that must be fulfilled by the system 300 when processing transactions. For example, the QoS parameters may specify guaranteed latency, jitter, bandwidth, transaction processing times, and the like. More generally, however, because the system 300 processes large numbers of transactions for a large number of clients, the system 300 must attempt to process each transaction as quickly as possible. Therefore, the controller 309 is configured to schedule received workloads in the system 300 in a manner that satisfies the QoS guarantees in the SLAs.

In some embodiments, the controller 309 may consider the CRs 302 as an n by m matrix of compute nodes, where n and m are any positive integer. For example, each compute node (physical and/or virtual) may be considered a point in the matrix, and the connections between each point in the matrix correspond to a network link in the fabric 303. Doing so allows the controller 309 to consider the matrix when scheduling workloads for processing in the system 300 such that the processing conforms with the QoS guarantees in the SLA for a given client.

Generally, to schedule workloads, the controller 309 may consider a plurality of heuristics. For example, the controller 309 may consider utilization levels of the computing resources 302. For example, for a given compute node and/or virtual machine executing on a compute node, the controller 309 may determine processor (CPU) utilization, memory utilization, storage utilization, network I/O utilization, and utilization of any other resource of the compute node. Generally, the controller 309 may select CRs 302 that have the lowest levels of utilization. Furthermore, the controller 309 may consider the utilization of the network links of the fabric 303 connected to each CR 302. For example, the controller 309 may consider the bandwidth utilization, throughput, latency, jitter, and any other aspect of the links of the fabric 303. More generally, the controller 309 may select nodes having the links with the lowest levels of utilization. Furthermore, the controller 309 may analyze the workload to determine what data stored by the system 300 is needed to process the transaction. For example, CRs 302-13 may store the current price of a stock that is specified in an immutable log for the transaction, while CRs 302-1 may store stale price data of the stock (e.g., last month's price of the stock). Therefore, the controller 309 may determine to place the workload on or near CRs 302-13 to provide faster access to the pricing data needed to process the trade. Similarly, the controller 309 may determine that the workload need not be placed near CRs 302-1, as CRs 302-1 include pricing data that will not be used to process the transaction. Further still, the controller 309 may determine which CRs 302 have the greatest number of links to the needed data. Doing so may ensure that alternate routes to the data exist if one or more other links become saturated.

Therefore, to schedule a workload in compliance with the QoS guarantees, the controller 309 may determine which CRs 302 have the lowest levels of resource utilization, which CRs 302 were least recently used, which CRs 302 have network links have the lowest levels of utilization, which CRs 302 store data that is most frequently accessed to process transactions, which CRs 302 include and/or are located nearest to the data required to process the transaction, and/or which CRs 302 have the most links in the fabric 303 to access the data required to process the transaction. Furthermore, the controller 309 may consider the impact that processing the workload will have on the system 300. For example, if placing the workload on CRs 302-5 would saturate the links to CRs 302-5 in the fabric 303, the controller 309 may refrain from placing the workload on CRs 302-5.

In some embodiments, the controller 309 may determine whether the utilization of the CRs 302 and/or the links in the fabric 303 exceed a respective threshold. For example, if the current and/or estimated use of the processors of a compute node is 80% and a processor use threshold is 75%, the controller 309 may determine to forego deploying a workload (and/or a portion thereof) to the compute node. As another example, if 70% of the memory of a compute node is currently utilized (and/or estimated to be utilized while processing the workload), and the memory use threshold is 60%, the controller 309 may forego deploying a workload (and/or a portion thereof) to the compute node. As another example, a compute node may have 10 network links in the fabric 303 to the data needed to process a transaction. If deploying the workload to the compute node would saturate all 10 links, the controller 309 may determine to forego deploying a workload (and/or a portion thereof) to the compute node. Instead, the controller 309 may determine to deploy the workload to a compute node that has more links to the needed data and/or links that will not be saturated (and/or utilized beyond a threshold utilization level) by processing the workload. As another example, if a network switch of the compute node is utilized beyond a threshold utilization, the controller 309 may determine to forego deploying a workload to the compute node. If, however, the network switch is not utilized beyond the threshold, the controller 309 may deploy the workload (and/or a portion thereof) to the compute node. As another example, the controller 309 may estimate an amount of time required to process the workload on the CRs 302 in light of the resource and/or fabric utilizations and determine whether the estimated time exceeds a guaranteed processing time in the SLA. If the estimated time to process the workload does not exceed the guaranteed processing time specified in the SLA, the controller 309 may deploy the workload (and/or a portion thereof) to the CRs 302.

In some embodiments, the controller 309 may maintain a log 310 describing each received workload and/or transaction. The log 310 may include entries specifying where each transaction is deployed for processing, what data the transaction accessed, and the results of processing each transaction (e.g., whether the amount of time required to process the transaction satisfied and/or violated the QoS guarantees). The log 310 may comprise a model which may process a transaction to produce a generate distribution specifying how the processing of the transaction will access data and/or communicate data within the system 300. For example, an ETF may comprise a plurality of stocks. The log 310 may specify that processing trades of the ETF may require access to data describing each stock in the ETF. Therefore, the controller 309 may determine to generate a grouping of the CRs 302 (e.g., one or more compute nodes) to process the ETF transaction. The grouping of CRs 302 may generally include the shortest number of paths in the fabric 303 to the data needed to process the transaction (e.g., by selecting CRs 302 that are nearest to the data describing each stock in the ETF). However, the grouping of CRs 302 may be defined by a radius that ensures the links in the fabric 303 will not become oversaturated when processing the ETF transaction.

In some embodiments, the controller 309 may compute a score for each of the CRs 302 and select one or more of the CRs 302 having the highest score to process a workload (or a portion thereof). The score may generally reflect the most suitable CRs 302 for processing the workload in light of the QoS requirements. For example, each score may be compared to threshold. If the score computed for a given CR 302 does not exceed the threshold, the controller 309 may determine to not deploy the workload (or a portion thereof) to the CR 302. If the score exceeds the threshold, the controller 309 may deploy the workload (or a portion thereof) to the CR 302. The controller 309 may use any suitable function to compute a score for the workload, where the function considers one or more of the current and forecast utilization of the CRs 309, the current and forecast utilization of the links of the fabric 303 to each CR 309, the distance (e.g., a number of network hops) of each CR 309 to the data needed to the workload, and the like.

In some embodiments, the controller 309 may break up the workload into smaller workloads (or subunits) and schedule each subunit of the workload on one or more CRs 302 to ensure that each subunit is processed in a manner that satisfies the QoS guarantees. The controller 309 may generally schedule each subunit according to the heuristics described above to ensure that each subunit is scheduled for processing according to the QoS guarantees. Furthermore, in some embodiments, the controller 309 may consider a grouping of CRs 302 when determining to deploy a workload. In such embodiments, the controller 309 considers whether the current and/or planned utilization of the grouped CRs 302 exceeds a threshold when deploying workloads. Similarly, the controller 309 may consider the number of links in the fabric 303 of the grouped CRs 302 as well as the use of the links in the fabric 303 when determining to deploy a workload to the grouped CRs 302.

Figure 4:
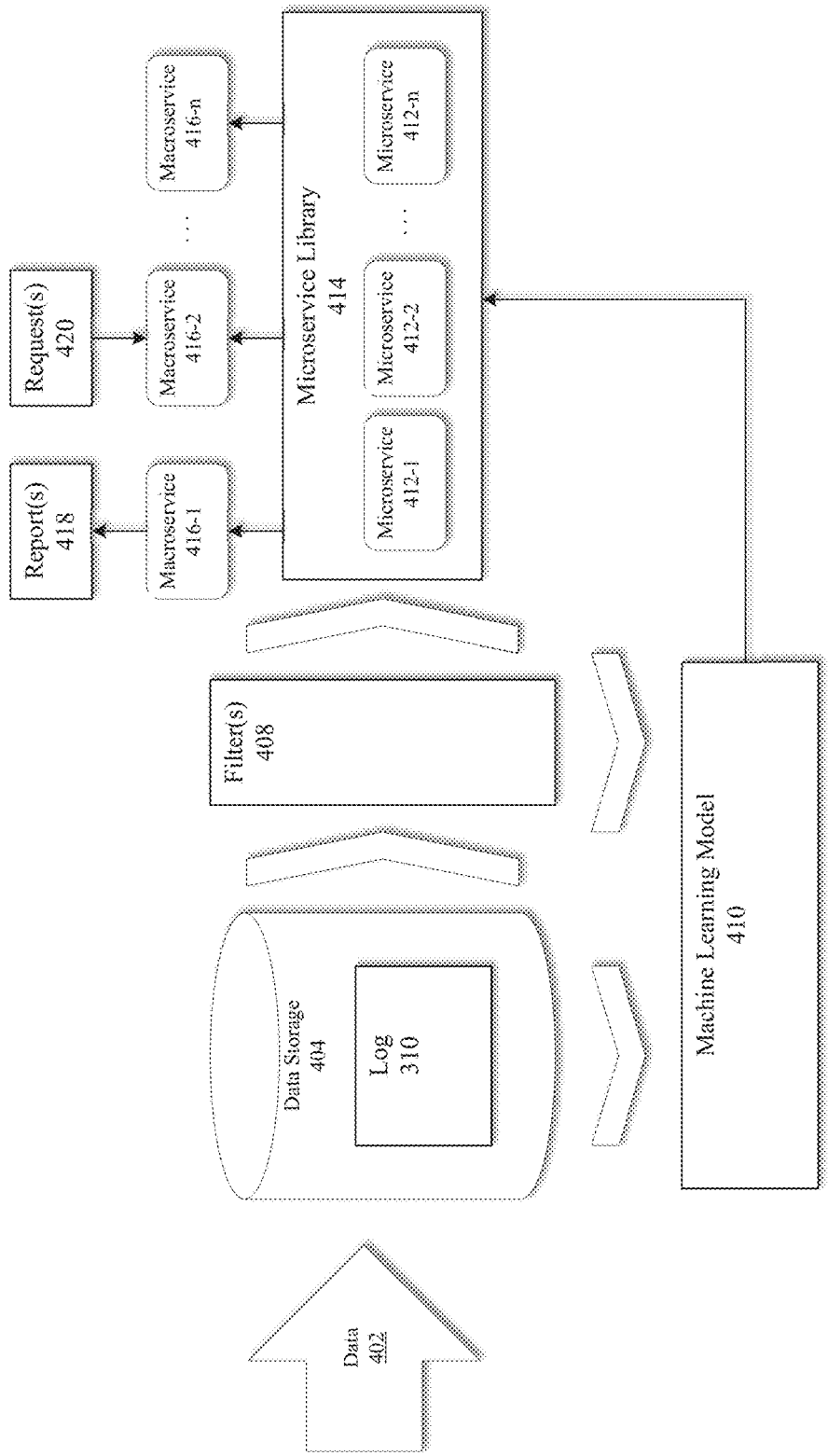
FIG. 4 illustrates an embodiment of exemplary logic and data flows through a computing architecture.

FIG. 4 depicts a block diagram describing exemplary logic and data flows through a computing architecture.

Data 402 may be received in a data storage 404. The data 402 may include discrete units of data and/or one or more data streams (e.g., communication channels that repeatedly provide one or more data units at a given rate). The data 402 may include, for example, data relating to an individual user (e.g., a financial client), aggregate data (e.g., reflecting conditions in a market, such as a financial market), cancelations of previously-received data, corrections of previously-received data, etc. In some cases, cancelations and/or corrections may be received that cancels or corrects other data items that have not yet been received (e.g., due to the order in which the data was transmitted or batched, network conditions, data losses, etc.).

The data storage 404 may include hardware, software, or a combination of hardware and software suitable for storing data. The data storage 404 may include one or more data structures, such as the log 310 or a database. The data structures may be configured to store and organize the data, and/or to facilitate retrieval of the data. In some embodiments, the entries in the log 310 may be organized chronologically (e.g., in the order in which the data 402 was received by the data storage 404, in a time-stamp order of the data 402, etc.). In some embodiments, the log 310 is a persistent and/or immutable log which allows individual data records to be written, but not to be directly deleted or changed. In some embodiments, the immutable log 310 specifies one or more transactions for processing. The controller 309 may schedule the transactions specified in the immutable log 310 for processing in compliance with QoS guarantees as described above.

In some embodiments, the data 402 stored in the data storage 404 may be subjected to one or more filters 408. The filters 408 may include data governance filters which, for example, match one or more rules against the data 402 and selectively pass the data 402 to other components in the architecture.

The data storage 404 and/or the filter(s) 408 may provide information to a machine learning model 410, such as an artificial neural network (ANN). The underlying model 410 may be configured to learn associations from patterns in the data 402, to predict future trends based on historical data observations, and to provide insights into why the data 402 appears the way that it does.

A library 414 of microservices 412-*i* may make use the data (e.g., the raw data stored in the data storage 404, the filtered data as presented by the filters 408, information output from the machine learning model 410, or various combinations of these types of data). Each microservice 412-*i* may represent an atomic computing unit configured to perform a defined task (e.g., computing a value for a financial variable for certain subsets of the data 402). The microservices 412-*i* may be used individually, or variously combined into macroservices 416-*i*. The macroservices 416-*i* may represent more complex operations in which the outputs of various microservices 412-*i* are combined or otherwise used to perform a specified task.

For instance, one macroservice 416-1 may use the outputs of various microservices 412-*i* to generate a report 418 (such as a financial report, disclosure form, etc.). In another example, an entity (such as a financial regulator) may issue a request 420 via a macroservice 416-2, and the microservice 416-2 may perform various operations to comply with the request (e.g., calling on another macroservice 416-1 to generate a report responsive to the request 420, correcting data 402 in the data storage 404, etc.). In some embodiments, macroservices 416-*i* may be combined to form other macroservices 416-*i*.

The microservices 412-*i* and/or the macroservices 416-*i* may be exposed to a third party (e.g., by use of an application programming interface, or "API"). In some cases, a single entity may provide the microservices 412-*i* and the macroservices 416-*i*. In other cases, one entity may provide the library 414 of microservices 412-*i*, and another entity may use the microservices 414 to generate their own customized macroservices 416-*i*.

The machine learning model 410 may be generated and/or refined via a machine learning process, such as the one depicted in the flow chart of FIG. 4. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models 410 may be used interchangeably to perform a task. Examples of tasks that can be performed at least partially using machine-learning models include various types of scoring; workload placement; transaction analysis; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Figure 5:
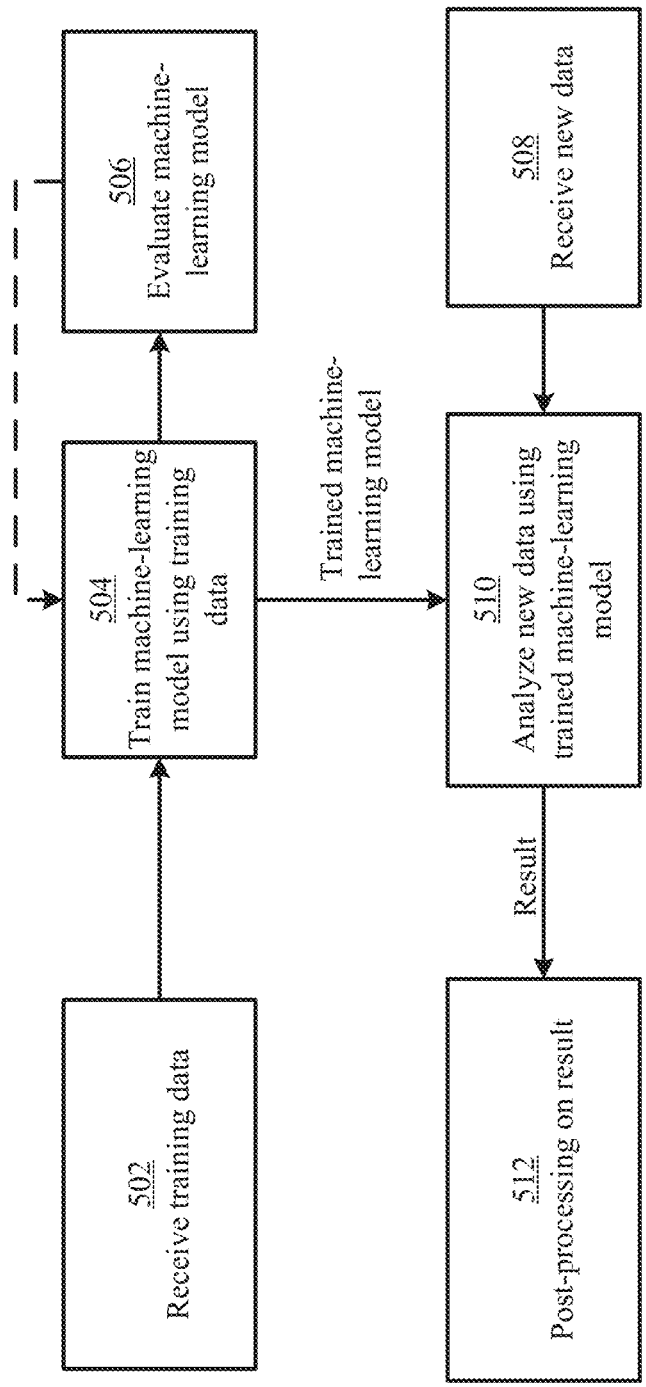
FIG. 5 illustrates an embodiment of a first logic flow.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 5.

In block 502, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model. In one example, the training data comprises a transaction log maintained by the controller 309 that describes each of a plurality of transactions scheduled for processing by the controller 309.

In block 504, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 506, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 504, where the machine-learning model can be further trained using additional training data or otherwise modified to improve accuracy. If the machine-learning model has an adequate degree of accuracy for the particular task, the process can continue to block 508.

In block 508, new data is received. In some examples, the new data is received from a remote database or a local database, constructed from various subsets of data, or input by a user. The new data may be unknown to the machine-learning model. For example, the machine-learning model may not have previously processed or analyzed the new data. The new data may comprise a new transaction for scheduling by the controller 309.

In block 510, the trained machine-learning model is used to analyze the new data and provide a result. For example, the new data, such as the workload (and/or the immutable log describing the transactions of the workload) can be provided as input to the trained machine-learning model. The trained machine-learning model can analyze the new data and provide a result that includes a classification of the new data into a particular class, a clustering of the new data into a particular group, a prediction based on the new data, or any combination of these. For example, the trained model may output one or more CRs 302 to process one or more portions of the workload. The controller 309 may then schedule the one or more portions of the workload on the CRs 302 outputted by the model.

In block 512, the result is post-processed. For example, the result can be added to, multiplied with, or otherwise combined with other data as part of a workload. As another example, the result can be transformed from a first format, such as a time series format, into another format, such as a count series format. Any number and combination of operations can be performed on the result during post-processing.

Figure 6:
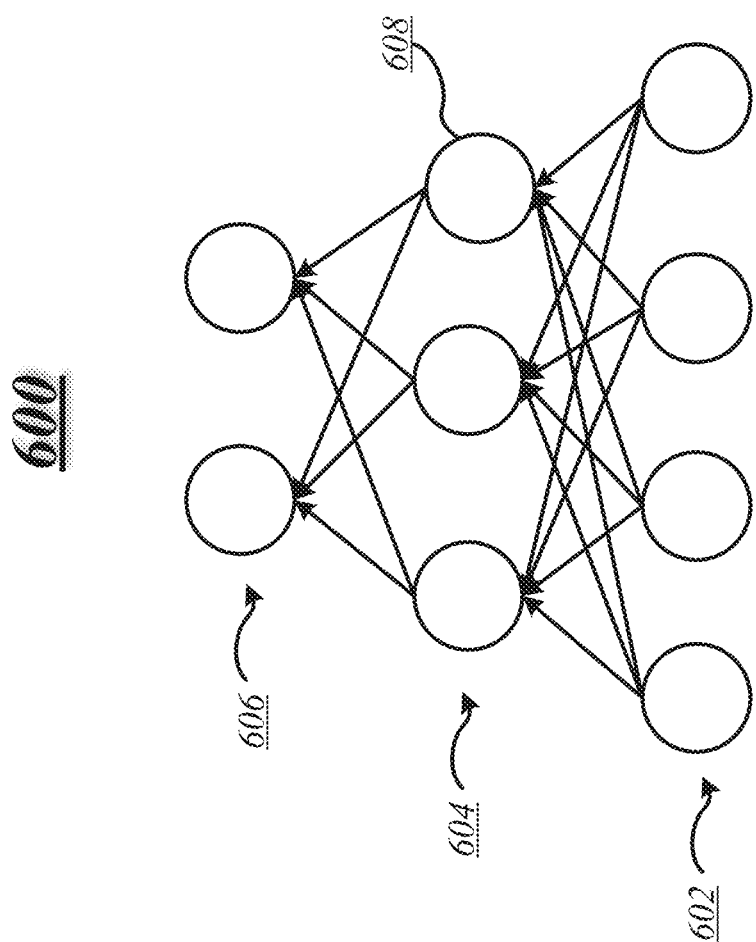
FIG. 6 illustrates an embodiment of a neural network.

A more specific example of a machine-learning model is the neural network 600 shown in FIG. 6. The neural network 600 is represented as multiple layers of interconnected neurons, such as neuron 608, that can exchange data between one another. The layers include an input layer 602 for receiving input data, a hidden layer 604, and an output layer 606 for providing a result. The hidden layer 604 is referred to as hidden because it may not be directly observable or have its input directly accessible during the normal functioning of the neural network 600. Although the neural network 600 is shown as having a specific number of layers and neurons for exemplary purposes, the neural network 600 can have any number and combination of layers, and each layer can have any number and combination of neurons.

The neurons and connections between the neurons can have numeric weights, which can be tuned during training. For example, training data can be provided to the input layer 602 of the neural network 600, and the neural network 600 can use the training data to tune one or more numeric weights of the neural network 600.

In some examples, the neural network 600 can be trained using backpropagation. Backpropagation can include determining a gradient of a particular numeric weight based on a difference between an actual output of the neural network 600 and a desired output of the neural network 600. Based on the gradient, one or more numeric weights of the neural network 600 can be updated to reduce the difference, thereby increasing the accuracy of the neural network 600. This process can be repeated multiple times to train the neural network 600. For example, this process can be repeated hundreds or thousands of times to train the neural network 600.

In some examples, the neural network 600 is a feed-forward neural network. In a feed-forward neural network, every neuron only propagates an output value to a subsequent layer of the neural network 600. For example, data may only move one direction (forward) from one neuron to the next neuron in a feed-forward neural network.

In other examples, the neural network 600 is a recurrent neural network. A recurrent neural network can include one or more feedback loops, allowing data to propagate in both forward and backward through the neural network 600. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 600 operates by receiving a vector of numbers from one layer; transforming the vector of numbers into a new vector of numbers using a matrix of numeric weights, a nonlinearity, or both; and providing the new vector of numbers to a subsequent layer of the neural network 600. Each subsequent layer of the neural network 600 can repeat this process until the neural network 600 outputs a final result at the output layer 606. For example, the neural network 600 can receive a vector of numbers as an input at the input layer 602. The neural network 600 can multiply the vector of numbers by a matrix of numeric weights to determine a weighted vector. The matrix of numeric weights can be tuned during the training of the neural network 600. The neural network 600 can transform the weighted vector using a nonlinearity, such as a sigmoid tangent or the hyperbolic tangent. In some examples, the nonlinearity can include a rectified linear unit, which can be expressed using the following equation:

$$y = \max(x, 0) \qquad \text{Equation 1}$$

In Equation 1, y is the output and x is an input value from the weighted vector. The transformed output can be supplied to a subsequent layer, such as the hidden layer 604, of the neural network 600. The subsequent layer of the neural network 600 can receive the transformed output, multiply the transformed output by a matrix of numeric weights and a nonlinearity, and provide the result to yet another layer of the neural network 600. This process continues until the neural network 600 outputs a final result at the output layer 606.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications system discussed herein.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Figure 7:
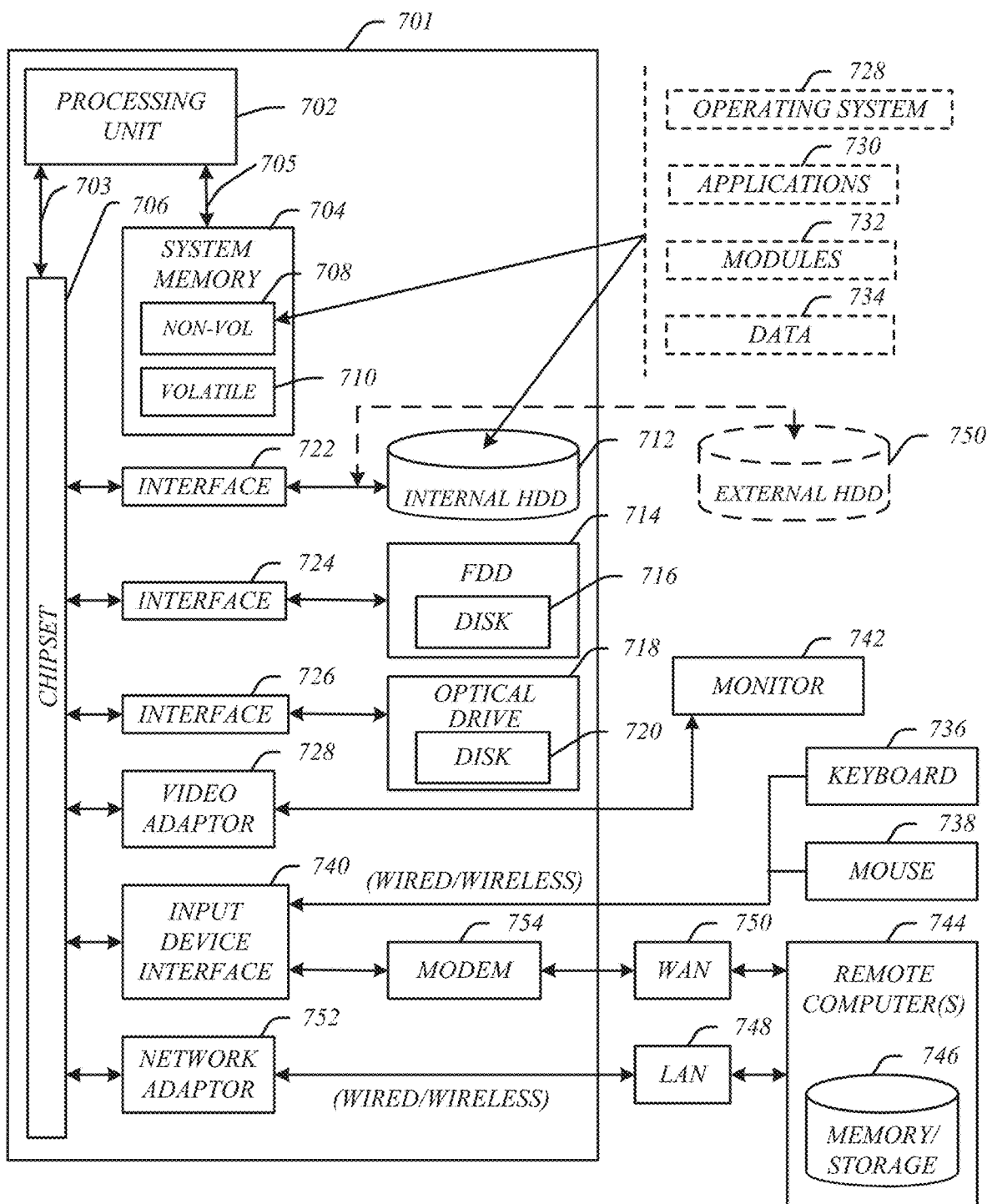
FIG. 7 illustrates an embodiment of an exemplary computing architecture.

The methods, systems, and functionality described herein may be embodied as instructions on a computer readable medium or as part of a computing architecture. FIG. 7 illustrates an embodiment of an exemplary computing architecture 700 suitable for implementing various embodiments described herein. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process executing on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a chipset 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core i9™, Core m3™, vPro™, Itanium®, Pentium®, Xeon®, and XScale® processors; and similar processors. Dual microprocessors, multi-core processors, and other multi-processor architectures may also be employed as the processing unit 702.

In some embodiments, the processing unit 702 couples with the chipset 706 via a highspeed serial link 703 and couples with the system memory 704 via a highspeed serial link 705. In other embodiments, the processing unit 702 may couple with the chipset 706 and possibly other processor units via a system bus and may couple with the system memory 704 via the chipset 706. In further embodiments, the processing unit 702 and the chipset may reside in a System-On-Chip (SoC) package.

The chipset 706 provides an interface for system components including, but not limited to, the system memory 704 to the processing unit 702. The chipset 706 may couple with any of several types of bus structure that may further interconnect to a memory bus (with or without a memory controller), a peripheral bus, and a local bus using any of a variety of commercially available bus architectures. Interface adapters 722, 724, 726, 728, 740, 752, etc., may connect to the chipset 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708. The controller 309 and/or the log 310 may be stored in the memory 708, 710.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components described herein, such as the controller 309 and the immutable log 310.

A user may enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the chipset 706, but can be connected by other interfaces such as a parallel port, IEEE 694 serial port, a game port, a USB port, an IR interface, and so forth.

A monitor 742 or other type of display device is also connected to the chipset 706 via an interface, such as a video adaptor 728. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many of or all the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the chipset 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Some aspects may utilize the Internet of Things (IoT), where things (e.g., machines, devices, phones, sensors) can be connected to networks and the data from these things can be collected and processed within the things and/or external to the things. For example, with the IoT, sensors may be deployed in many different devices, and high-value analytics can be applied to identify hidden relationships and drive increased efficiencies. This can apply to both Big Data analytics and realtime (streaming) analytics.

Some systems may use Hadoop®, an open-source framework for storing and analyzing big data in a distributed computing environment. Apache™ Hadoop® is an open-source software framework for distributed computing. For example, some grid systems may be implemented as a multi-node Hadoop® cluster, as understood by a person of skill in the art. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction.

Figure 8:
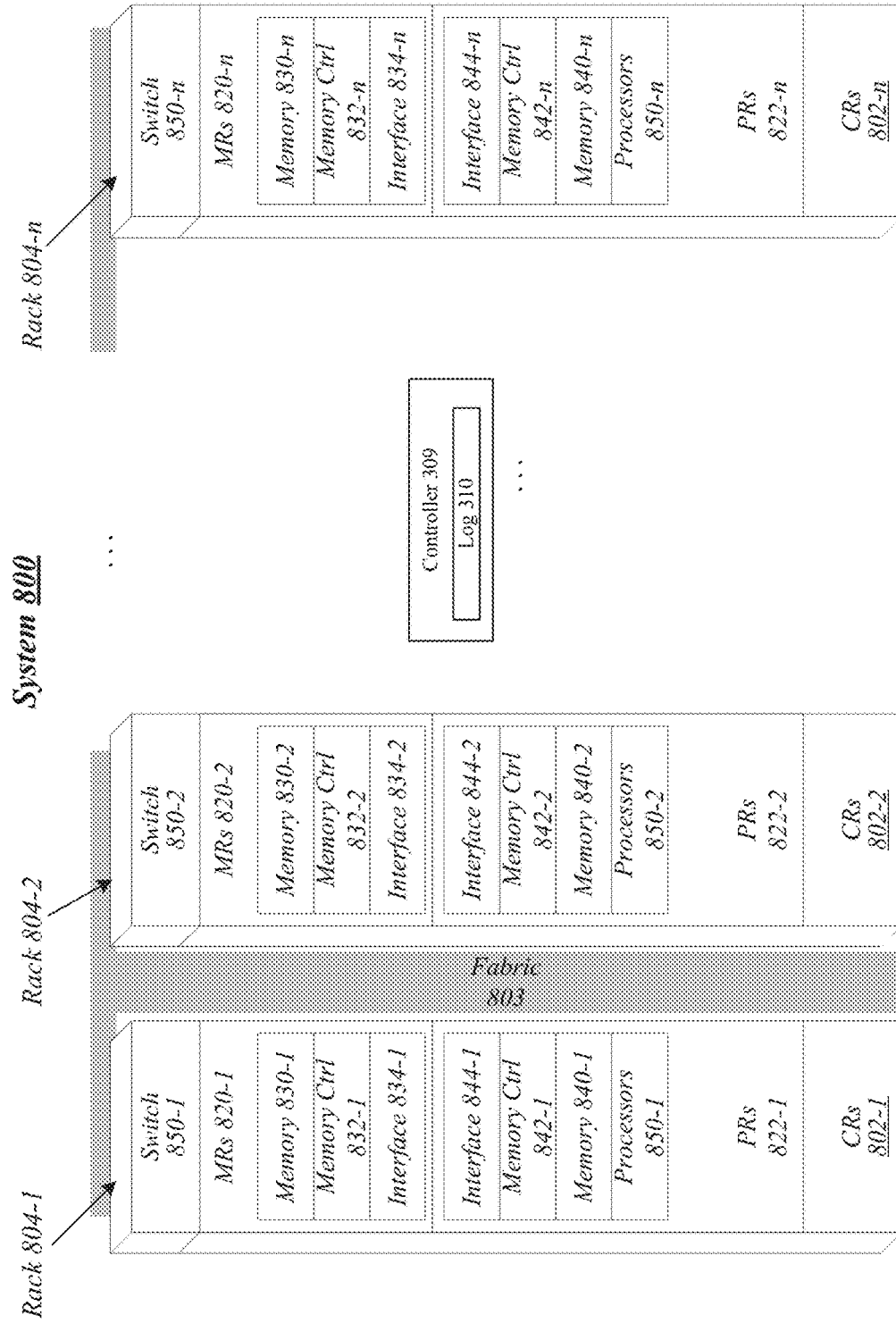
FIG. 8 illustrates an embodiment of an example system.

FIG. 8 illustrates an example of a system 800 that may generally be representative of a distributed cloud-based computing system or another type of computing network in that one or more techniques described herein may be implemented according to various embodiments. As shown in FIG. 8, system 800 may generally be a rack-based system including of a number of racks 804-n, where n may be any positive integer. Each of the racks 804 may be configured to house computing resources 802 to process data and information. Moreover, the racks 804 may be coupled with each via a fabric 803, which may be similar to or the same as fabric 303 as similarly discussed above. The racks 804 may be located within the same data center and other data centers coupled via the fabric 803 and cloud-based networking infrastructure. The fabric 803 may include a combination of electrical and/or optical signaling media, and high bandwidth interconnects, such as Gigabit Ethernet, 10 Gigabit Ethernet, 100 Gigabit Ethernet, InfiniBand, Peripheral Component Interconnect (PCI) Express (PCIe), PCIe 1.0, PCIe 2.0, PCIe 3.0, PCIe 4.0, PCIe 5.0, and so forth. In one example, the fabric 803 may include networking hardware to support communication of data and information in accordance with the PCIe 4.0 and provides 16 gigatransfers per second (GT/s) bit rate. As will be discussed in more detail below, these high data rates enables computing resources between the racks 803 and across the cloud to be pooled together to provide processing and memory capabilities. Although not pictured, each rack 804 may include instances of the controller 309 and/or the log 310. More generally, the system 800 may include instances of the controller 309 and/or the log 310 to schedule workloads for processing on the racks 804-1 and/or any component thereof.

In embodiments, a rack 804 includes computing resources 802, which may include processing resources 822 and memory resources 820. The processing resources 822 include one or more processors 850 having processing circuitry to process information and data. The one or more processors 850 may be a single core processor or multi-core processor. In some embodiments, the one or more processors 850 may each be a multi-chip package (MCP), a system on chip (SoC) package, and so forth including other circuitry and components, such as memory 840, a memory controller 842, and one or more interfaces 844. Embodiments are not limited in this manner. In one embodiment, the computing resources 802 are representative of the computing resources 302 of the system 300, and the controller 309 may schedule workloads for processing in the system 800 as described above.

In embodiments, the memory 840 is a local memory, e.g., coupled and/or on the same die or package as the one or more processors 850. In one example, the memory 840 is cache memory and stores information and data for processor cores of the processors 850. More specifically, the memory 840 may store copies of data that is frequently used by a processor core stored in "main" memory, such as memory 830 of the same rack 804 or memory 830 of a different rack 804. In embodiments, the memory 840 local to a processor core, e.g., on the same die or package, may be relatively small in size compared to "main" memory. For example, memory 830 may be 4, 8, 16, kilobytes (KB) or megabytes (MB) in size, while "main" memory may be on the order of gigabytes (GB) in size, e.g., 2, 4, 8, 16 GBs.

In embodiments, the memory 830 and memory 840 may be configured as a hierarchy of one or more cache levels (L1, L2, L3, etc.). Memory 840 may be on the same die or package as the processor 850 and may be part of higher level cache (L1, or L2). Memory 830, which may be within the same rack 804 but not on the die with the processing cores, may be lower level cache, e.g., L3 cache. While memory 830 of a different rack 804 then the processor 850 utilizing it, may be used as even lower level cache, e.g., L4 or L5 cache. In these embodiments, the higher level cache may store information and data that is accessed more frequently than information and data store in a low-level cache. Moreover, the information and data may be moved among the different levels of memory 840 and 830 based on a change in use and/or access. For example, as information and data are used more frequently, it may be moved/copied from a lower level cache, e.g., L3, L4, or L5, to a higher level cache, e.g., L1 or L2. Similarly, as information and data stored in lower level cache is used less frequently, it may be copied or moved to a higher level cache.

In one example, the first rack 804-1 may include processing resources 822-1 having one or more processors 850-1 and local memory 840-1, which may be part of the same die or package as processors 850-1, and may be an L1 or L2 cache for the processor 850-1. Further, memory 830-1 of the same rack 804-1 may be considered or configured a lower level cache for the processor 850-1, e.g., L3. The processor 850-1 may also use memory 830-n, where n may be any positive integer other than 1 in this example, as even lower level cache, L4 or L5 cache.

In embodiments, the processing resources 822 may include a memory controller 842 or a digital circuit to manage the flow of data between memory 840, memory 830, and processors 850. The memory controller 842 may be part of the same die or package as the processors 850 or integrated on another chip. The memory controller 842 may control read and writes to memory 840, which may be local or on the same die as the memory controller 842. In some embodiments, the memory controller 842 may be coupled with the memory resources 820 via one or more interfaces 834 and 844. The memory controller 842 may operate in conjunction with memory controller 832 of the memory resources 820. The memory controllers 832 and 842 may operate in conjunction with each other to perform read/write operations to store data and information in memory 830, for example. In embodiments, the information, data, and memory requests may be communicated between the memory controllers 832 and 842 via the interfaces 844 and 834. In some embodiments, the interfaces 844 and 834 may be part of the fabric 803 coupling the processing resources 822 and the memory resources 820 within the same rack 804. The interfaces 844 and 834 may be optical and/or electrical interfaces and enable high-speed communication between the computing resources 802, e.g., utilizing PCIe 4. However, Embodiments are not limited in this manner.

In some embodiments, the computing resources 802, including the processing resources 822 and the memory resources 820, of one rack 804 may be coupled with and utilize computing resources 802 of another rack 804 via one or more switches 850, which may be part of the fabric 803. In embodiments, the switches 850 may be electrical and/or optically coupled with each other and enable communication via packet switching. In embodiments, the switches 802 include circuitry to extend the PCIe fabric from within a rack 804 to one or more other racks 804 and computing resources 802 therein. More specifically, a switch 850 may include circuitry and logic such that computing resources 802 of one rack 804 can share input/output (I/O) and memory functionality with computing resources 802 of another rack 804 utilizing single root I/O virtualization (SR-IOV) or multifunction virtualization. Embodiments are not limited in this manner.

Like system 300, system 800 may enable the combination of computing resources 802 to process a workload, job, and/or task. For example, the controller 309 may receive a request to process one or more workloads, such as those related to performing financial calculations, determine the computing resources 802 required to perform the one or more workloads as described above, and combine the computing resources 802 to perform the one or more workloads, e.g. generate composed computing resources 802. In embodiments, the controller 309 may determine the number of computing resources 802 to combine based on requirements, such as a service level agreement (SLA), or another prioritizing scheme. As mentioned, the computing resources may be combined within a rack 804, across racks 804 within the same data center, and across racks 804 in different data centers via the fabric 803 and cloud-based infrastructure.

Figure 9:
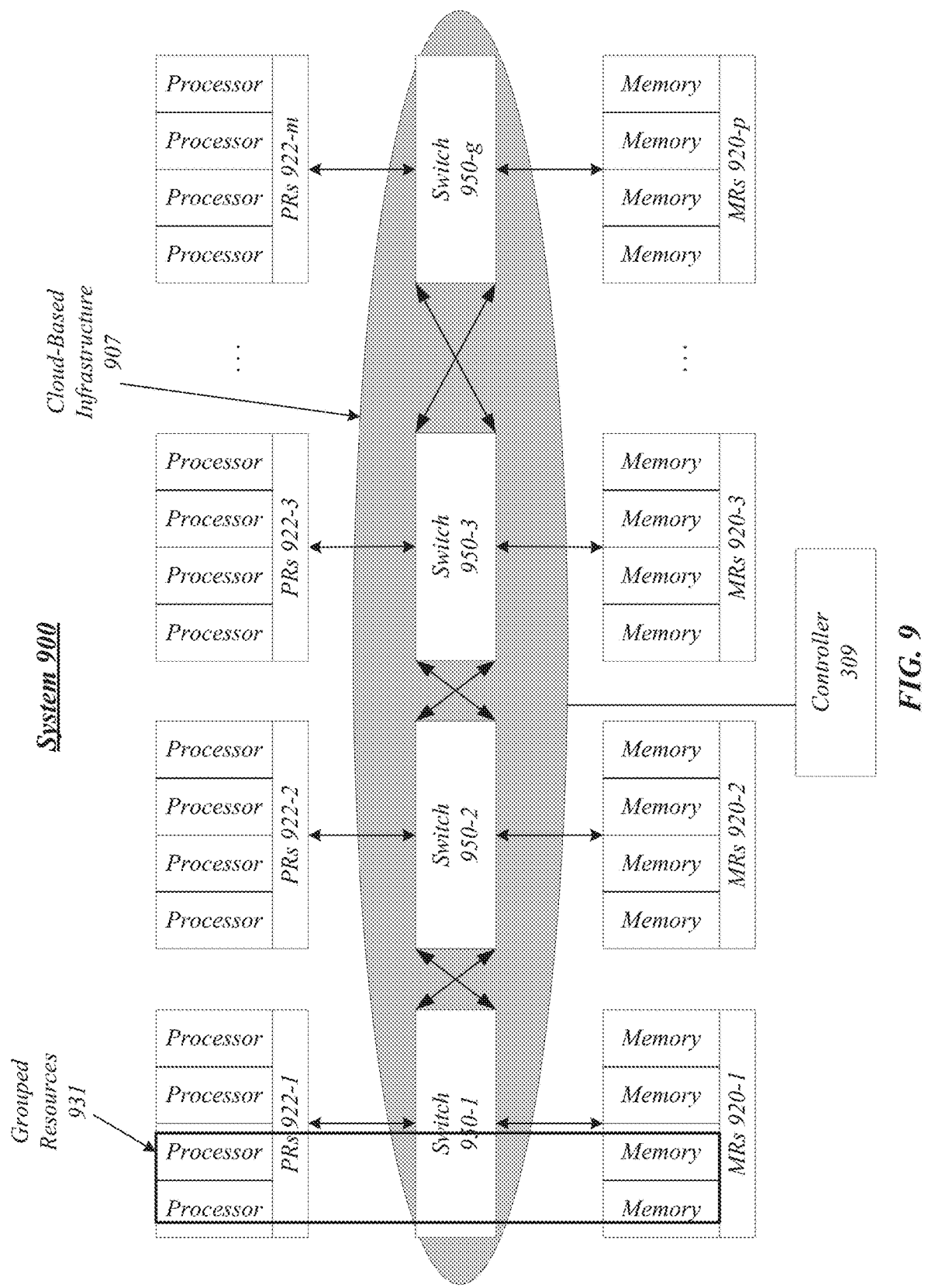
FIG. 9 illustrates an embodiment of an example system.

FIG. 9 illustrates another example of a system 900, which may be similar to or the same as system 800, and/or any other system discussed herein. FIG. 9 illustrates a number of computing resources, including memory resources 920 and processing resources 922, coupled with each via a plurality of switches 950-*g*, where g may be any positive integer. In embodiments, the computing resources may be coupled via fabric and the cloud-base infrastructure. In the illustrated example, one or more of the computing resources may be located within the same data center, while one or more other computing resources may be located in a different data center.

As discussed, the processing resources 922 may include one or more processors, processing packages, and processing cores, and the memory resources 920 may include one or more memory chips or banks of memory to store information and data for the system 900. The system 900 may include any number of processing resources 922-*m* and memory resources 920-*p*, where m and p may be any positive integers (same or different). These computing resources may be pooled and grouped together to perform one or more workloads. The system 900 includes the controller 309, which may be one or more servers and devices capable of coordinate various aspects of the system 900 including receiving workloads, determining computing resources for the workloads, causing the resources to perform work on the workloads, grouping computing resources together to perform the work on the workloads, notifying a user and/or user system that the workloads completed, and other coordinating tasks. For example, the controller 309 may coordinate and cause processing of multiple workloads at time, which may include determine priority levels for the workloads and so forth. In embodiments, the controller 309 may operating in accordance with one or more SLAs and or user configurations. For example, an SLA and/or user setting may specify which workloads and/or which types of workloads have higher priorities than other types of workloads. Embodiments are not limited in this manner.

In the illustrated example of FIG. 9, the controller 309 has generated grouped resources 931 that includes processors from processing resources 922-1 and memory from memory resources 920-1. In embodiments, the grouped resources 931 may represent a composed node, and the computing resources may be utilized to perform one or more workloads. Note that although the box around the grouped resources 931 includes a portion of switch 950-1, the traffic including memory read/write requests, data, and information, communicated between the processing resources 922-1 and memory resources 920-1 may pass through switch 950-1 and/or any other of the switches 950-*g* based on the networking configuration. Further, in embodiments, the processing resources 922-1 and memory resources 920-1 may be incorporated in the same rack, and the traffic may pass through switch 950-1. In other instances, the processing resources 922-1 and memory resources 920-1 may be incorporated into different racks, and the traffic may pass through switch 950-1 and/or any other switches 950-*g*. As similarly discussed above, the switches 950, the fabric, and the cloud-based infrastructure 907 support high band width communications, e.g., PCIe 4 operating at approximately 16GT/s or 8 GB/s total for 4 lanes).

Figure 10:
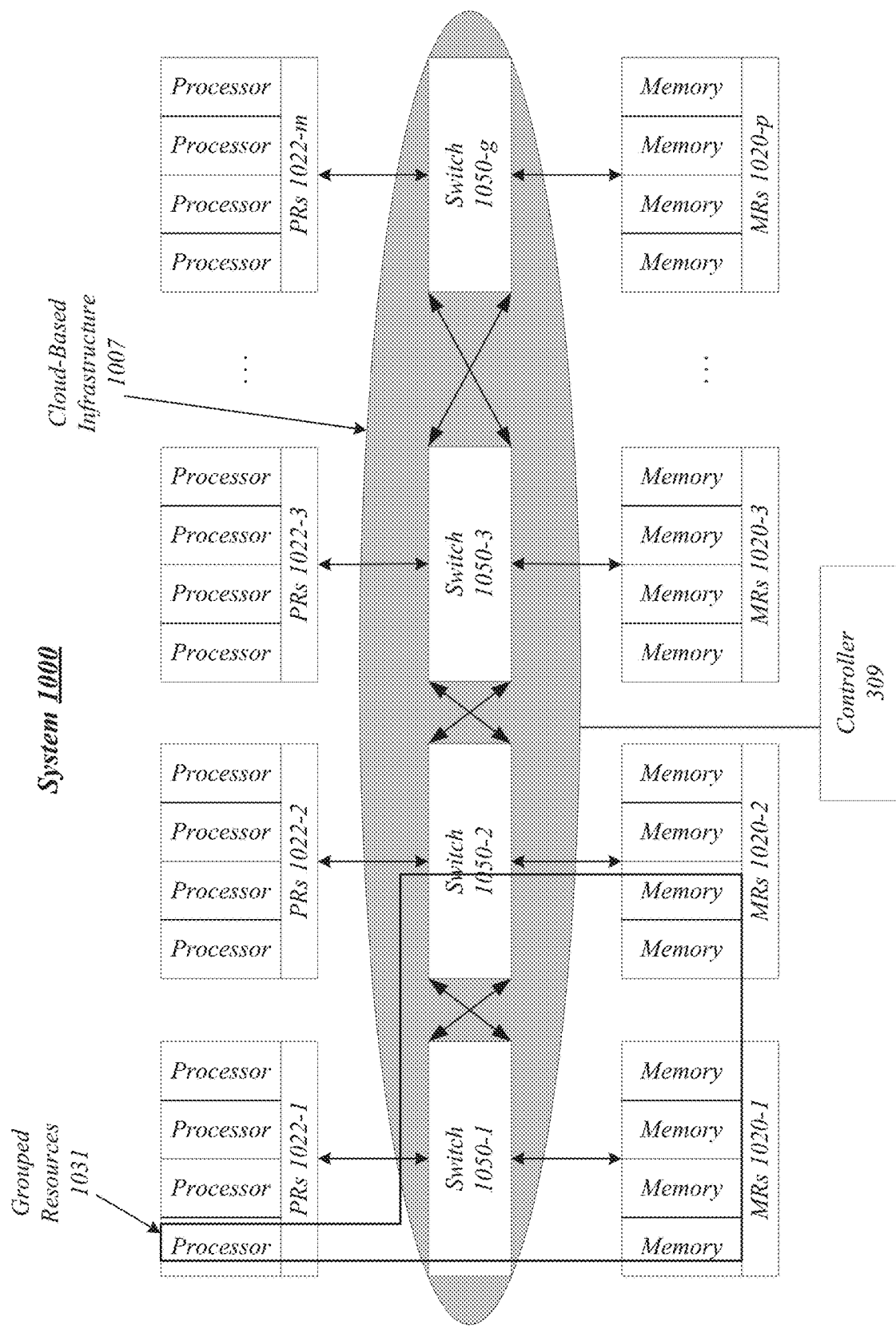
FIG. 10 illustrates an embodiment of an example system.

FIG. 10 illustrates another example of a system 1000, which may be similar to or the same as system 300, system 800, system 900, and/or any other system discussed herein. FIG. 10 illustrates a number of computing resources, including memory resources 1020 and processing resources 1022, coupled with each via a plurality of switches 1050-*g*, where g may be any positive integer. In embodiments, the computing resources may be coupled via fabric and the cloud-base infrastructure 1007. In the illustrated example, one or more of the computing resources may be located within the same data center, while one or more other computing resources may be located in a different data center.

In the illustrated example, system 1000 may be the same as system 1000, however, may be in a different configuration. In this example, the controller 309 has generated grouped resources 1031 that includes processors from processing resources 1022-1, a memory from memory resources 1020-1, and memory from memory resources 1020-2. In embodiments, the grouped resources 1031 may represent a composed node, and the computing resources may be utilized to perform one or more workloads, such as processing transactions defined by one or more records (or entries) in an immutable log 310. As similarly discussed, traffic communicated between the computing resources of the grouped resources 1031 may be communicated through one or more switches, including switch 1050-1 and switch 1050-2. However, embodiments are not limited in this manner, and the traffic may be communicated to other switches 1050-g (and networking equipment). In this example, the controller 309 may receive a request to perform one or more workloads to process data and information and based on a priority level, generated the grouped resources 1031. Moreover, embodiments are not limited to these examples. One or more computing resources may grouped to generate a composed node from any one of a plurality of racks that may be part of one or more data centers and coupled via the cloud-based infrastructure 1007, for example.

Figure 11:
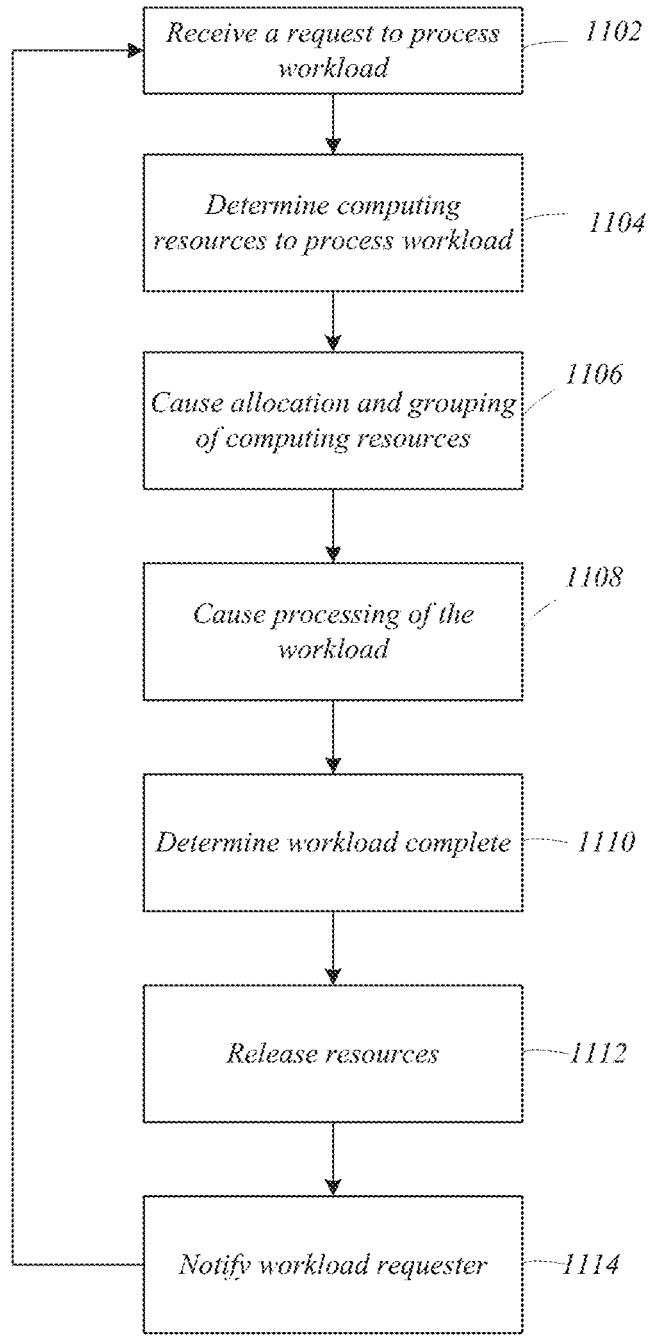
FIG. 11 illustrates an embodiment of a second logic flow.

FIG. 11 illustrates an example of a processing flow 1100 that may be representative of some or all the operations executed by one or more embodiments described herein. For example, the processing flow 1100 may illustrate operations performed by the controller 309 to schedule one or more workloads for processing on a cloud-based distributed system. However, embodiments are not limited in this manner, and one or more other components may perform operations to enable and support the operations discussed in this processing flow 1100.

At block 1102, the processing flow 1100 includes receiving a request to process or one or more workloads by a cloud-based computing system. The request may include information and data used to perform the workload, such as financial information, and may be received from one or more other systems. In embodiments, the request may indicate processing that needs to be done on the information and data to generate a result. For example, the workload may be defined by an immutable log specifying details of a transaction to be processed (e.g., the purchase and/or sale of a stock).

At block 1104, the processing flow 1100 includes the controller 309 determining one or more computing resources to be utilized to process the workload. The one or more resources may include processing resources, such as processors and/or processing cores, and memory resources, such as memory. In embodiments, the controller may determine which resources to process based on one or more criteria including, a priority level for the workload, computing resources available, location of computing resources, processing/memory capabilities of the computing resources, processing requirements for the workload, an SLA associated with the requester of the workload, and so forth. For example and in some embodiments, the controller may determine one or more computing resources to process the workload based on the computing resources being within the same data center. In other instances, the controller may determine group computing resources that are located within different data centers. Embodiments are not limited to this example. As stated, the controller 309 may consider the utilization levels of the computing resources (e.g., compute nodes), the utilization levels of the fabric links to each computing resource, the number of links from the computing resource to data needed to process the transaction, and/or the log 310 when selecting one or more computing resources to process the workload.

At block 1106, the controller 309 may allocate and group the one or more computing resources to process the workload. For example, the controller 309 may identify and provide information to the computing resources (and controlling software) to allocate the resources for the workload. In one example, the computing resources may be controlled by an operating system and the entire computing resource may be allocated to process the workload. In another example, the computing resources may be part of a virtual environment and may be controlled via a virtual machine monitor, such as a hypervisor, that operates virtual machines in the virtual environment. In another example, the computing resources may be controlled by a docker engine, and the workload may be processed in a container operating. In both the virtual machines and docker system, the computing resources may be shared among a plurality of workloads. Embodiments are not limited in this manner. The controller 309 may generally allocate and group resources based on the utilization levels of the grouped computing resources, the utilization levels of the fabric links to each group of computing resources, the number of links from the group of computing resources to data needed to process the transaction, and/or the log 310.

At block 1108, the processing flow 1100 includes processing and/or causing the workload to be processed by the computing resources. For example, the transaction defined by the immutable log may be processed. The computing resources may communicate between each other via a fabric and/or cloud-based networking infrastructure which includes one or more high speed interconnects, such PCIe-4. As previously discussed, these high-speed interconnects enable the computing resources to be located within the same data center and among other data centers while maintaining high-speed connectivity between themselves. For example, a processing resource may be coupled with a memory resource in a different data center and still be able to utilize the memory resource as "main" memory, cache memory, and/or in a memory hierarchy as previously discussed.

In embodiments, the processing 1100 includes determining that the workload is complete, e.g., done being processed at block 1110. For example, the computing resources and/or controlling software may send a notification to the controller indicating that the workload has completed. At block 1112, the controller 309 may release the computing resource, e.g., make them available to process other workloads. Further and at block 1114, the controller may notify the requesting system that the workload is complete including providing any results for the workload.

Figure 12A:
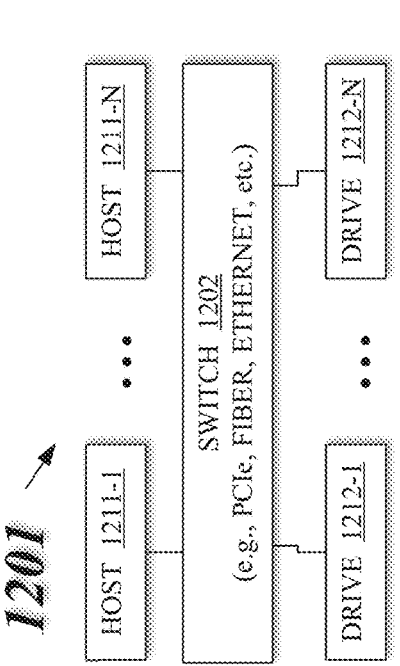
FIGS. 12A-12B depict embodiments of a database system.
Figure 12B:
Figure 12C:
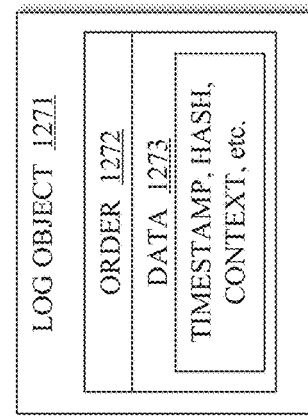
FIGS. 12C-12D depicts embodiments of data structures in the database system.
Figure 12D:
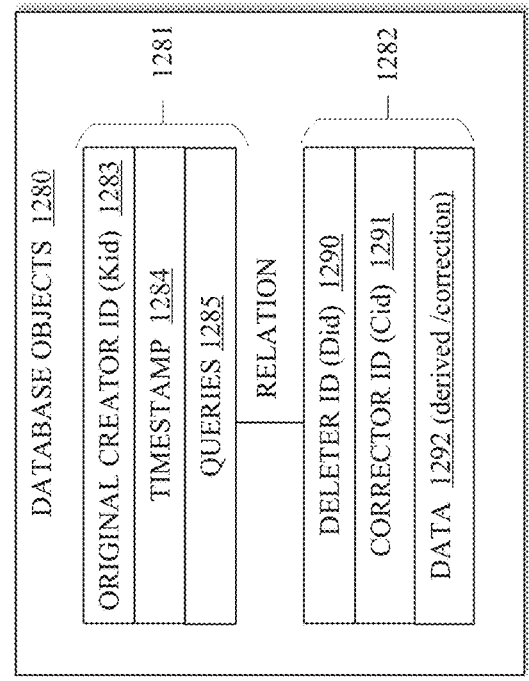

FIGS. 12A-12B depict embodiments of a database system 1200 and FIGS. 12C-12D depicts embodiments of data structures in the database system 1200. In particular, FIG. 12A illustrates a layer diagram of a database system 1200 that interacts with computing node(s) 1210. The computing node(s) 1210 may be local or remotely located computers, servers, workstations, or the like such as the computer 700 illustrated in FIG. 7. In many embodiments, the computing node(s) 1210 obtain and forward raw event data to the database system 1200 or consume data, derived data, queried data, summarized data, reports, and/or the like from the database system 1200.

The database system 1200 may comprise a combination of hardware and code to receive and store raw event data as log object(s) 1260 in a persistent log and to derive or compute derived data based on the raw event data to store in database object(s) 1250 in a persistent database. In many embodiments, the database system 1200 captures a representation of the financial environment within which financial calculations and decisions are made and permanently stores that representation, at least for a period of time, to facilitate derivation and/or summarization of financial data. The summarization and/or derivation adds business intelligence to the data to form financial information to provide to authorized users or consumers in the form of reports, tables, lists, SQL databases, graph databases, relational databases, and/or any other data structure. The database system 1200 may maintain persistent records of derivations and summarizations in the form of database objects 1250. The derivations include, for instance, computations, corrections, and/or cancelations of the raw event data in the log object(s) 1260. The derived data may include, for instance, trades, settlements, and holdings such as stock holdings, stock trades, stock buys, stock sells, mutual fund holdings, mutual fund trades, mutual fund buys, mutual fund sells, commodity holdings, commodity trades, commodity buys, commodity sells, net asset values, and/or the like. The database system 1200 may include immutable log objects, such as the log objects 1260, describing transactions scheduled for processing by the controller 309.

In many embodiments, the database system 1200 may maintain not only persistent records of the computations, summarizations, corrections, and/or cancelations but also persistent records of the logic or code to perform the computations, summarizations, corrections, and/or cancelations such that the database system 1200 or another system can perform such derivations on the raw event data included in the log object(s)s 1260 to recreate the data derived from such computations, summarizations, corrections, and/or cancelations. The logic or code may comprise, for instance, the logic to perform the derivations, code in the host environment (e.g. software environment) that affect the logic to perform the derivations, code of a virtual machine within which the database system 1200 performs derivations, and/or the like.

The database system 1200 may comprise service layer(s) 1220, translation layer(s) 1230, and physical layer(s) 1240. The service layer(s) 1220 may comprise producer(s) 1222 and consumer(s) 1224. The producer(s) 1222 may comprise one or more application programming interfaces (APIs) that receive, index, encrypt, and store raw event data from the computing node(s) 1210 as log object(s) 1260 in a persistent log. The consumer(s) 1224 may query data and derived data on behalf of the computing node(s) 1210 and present the results of the query in a format requested by the computing node(s) 1210 or a format optimized for usage by the computing node(s) 1210. In other words, the service layer(s) 1220 may provide an interface to access the data in the database object(s) 1250 and/or the log object(s) 1260 in any data structure. For example, a consumer may request a report via a comma-separated values file format, an online analytical processing (OLAP) format or an online transactional processing (OLTP) format. The producer(s) 1222 and consumer(s) 1224 may each comprise one or more of the microservices and/or macroservices such as the microservices 412-1 through 412-N and the macroservices 416-1 through 416-N illustrated in FIG. 4 to perform the services provided to the computing node(s) 1210. One or more microservices and/or macroservices operating on behalf of the consumer(s) 1224 may generate the data structure and populate fields of the data structure with pointers to the corresponding raw event data and derived data prior to transmitting the data structure to the computing node(s) 1210.

In some embodiments, the service layer(s) 1220 may perform services such as estimating a trade settlement, estimating a net asset value, estimating a stock holding, estimating a stock value, estimating a mutual fund value, estimating a commodity value, and/or the like. In further embodiments, the service layer(s) 1220 may perform services such as estimating a trade settlement, estimating a net asset value, estimating a stock holding, estimating a stock value, estimating a mutual fund value, estimating a commodity value, and/or the like as of a specified time and within a specific time frame.

In many embodiments, in addition to limiting access to data to authorized users or processes, the database system 1200 may affinitize data to one or more geographical locations and/or anti-affinitize the data to one or more geographical locations. In other words, some financial data should or must remain within certain geographical areas and should not or must not enter other geographical areas. A service layer(s) 1220 service may provide at least one mechanism to enforcing geographical locations on data in the financial information provide to the computing node(s) 1210.

The translation layer(s) 1230 may include one or more layers to facilitate the generation of representations of the data in multiple formats or any format for which an API can generate by provision of predetermined indices and indices that the translation layer 1230 generates on-the-fly. For instance, the raw event data in the log object(s) 1260 may include a unique index or pointer that uniquely identifies the location of the log object(s) 1260 in the persistent log. Similarly, the database object(s) may include a unique index or pointer that uniquely identifies the location of the database object(s) 1250 in the persistent database. Furthermore, the database object(s) 1250 may include predetermined sets of indices to support common or frequently-requested queries or derivations. The translation layer(s) 1230 may generate indices during execution of less frequently requested queries or derivations.

In one embodiment, generation of indices to raw event data may comprise generation of indices to a current holding of stock shares, a buy of stock shares, a sell of stock shares, a correction of raw event data such as trade data or settlement data, a cancelation of raw event data such as trade data or settlement data, and/or the like. In another embodiment, generation of indices to raw event data may comprise generation of indices to timestamps to indicate that time at which the transaction settled, a price of a share of the stock at the time of settlement of the transaction, an entity that placed the order, an entity that fulfilled the order, the number of shares of the stock that transferred at the settlement, the funds transferred at settlement, the entity that transferred the funds, the entity that received the funds, and/or the like.

The physical layer(s) 1240 may support the random-access of data such as raw event data in the log object(s) 1260 and derived data in the data object(s) 1250 to support the translation(s) layer 1230 and services layer(s) 1220 services. In some embodiments, the physical layer(s) 1240 provide "byte access". In other words, the physical layer(s) 1240 provide access at a level of granularity of a byte or 8 bits to increase the efficiency of access to the data without necessarily implementing queuing or caching schemes to reduce inefficiencies involved with levels of granularity that are greater than a byte. In many of the embodiments, the physical layer(s) 1240 maintains a list of the log object(s) 1260 and a list of the database object(s) 1250. In some embodiments, the list of database object(s) 1250 reside in a relational database such as a database with an Apache Kafka architecture.

FIG. 12B illustrates an embodiment of a system 1201 such as the physical layer(s) 1240 illustrated in FIG. 12A. The system 1201 may provide random access to large stores of data including the database object(s) 1250 and the log object(s) 1260 to the hosts 1211-1 through 1211-N via switch 1202. The hosts 1211-1 through 1211-N may perform the services layer(s) 1220 and translation layer(s) 1230 operations. The switch 1202 may comprise one or more switches such as an Avago/PLX PEX3090 family switch to provide random-access to the drives 1212-1 through 1212-N for the hosts 1211-1 through 1211-N via a fabric such as PCIe (Peripheral Component Interconnect Express). In one embodiment, the switch 1202 can support up to fifty hosts 1211-1 through 1211-N. In other embodiments, the fabric may include Ethernet, other conductor-based buses or optical buses such as Fiber Channel, Infiniband, Omni-path, and/or the like.

In many embodiments, the database system 1200 executing on the hosts 1211-1 through 1211-N, is optimized for a low granularity of random access, such as byte access, to data residing on the drives 1212-1 through 1212-N. For example, at a byte level of granularity, the database system 1200 may, in many instances, access the data and only the data of interest since the byte is a common level of granularity with which many computer systems operate. In contrast, hard disk drive may have a level of granularity of on block, which is 4 kilobytes (KB). As a result, if the database system 1200 stores data on a hard disk drive and requires access to one byte of data, the hard disk drive will read and return 4 KB. If the database system 1200 requires another byte of data, the database system 1200 may have to read another 4 KB of data to obtain the one byte.

The switch 1202 may provide random access to the drives 1212-1 through 1212-N by virtualizing routing between the hosts 1211-1 through 1211-N and the drives 1212-1 through 1212-N. Bus architectures such as PCIe are designed to interconnect one host with one device. The switch 1202 may implement connections such as Tunneled Window Connections (TWCs) that allow multiple hosts 1211-1 through 1211-N to communicate with multiple drives 1212-1 through 1212-N via a PCIe bus. In other words, the switch 1202 may offer multi-route input/output (I/O) virtualization (MRIOV) to facilitate direct access by any host 1211-1 through 1211-N to the content on any drive 1212-1 through 1212-N. For instance, the switch 1202 may intercept an incoming packet and emulate another device to hide the host or drive status and make the host or drive look like a target device so the hosts 1211-1 through 1211-N may each directly access any of the drives 1212-1 through 1212-N.

In several embodiments, the drives 1212-1 through 1212-N may comprise 3D XPoint® NVMe (non-volatile memory) solid state drives (SSDs) that offer byte level access. In combination with the MRIOV or similar arrangement, the bank of drives 1212-1 through 1212-N can be as accessible as memory such as DDR dynamic random-access memory and 3D XPoint® NVMe (non-volatile memory). In other embodiments, the drives 1212-1 through 1212-N may comprise other SSDs, flash drives, optical drives, hard drives, or the like.

FIG. 12C illustrates an embodiment of a log object 1271 such as the log object(s) 1260 in FIG. 12A for a persistent log such as the log 310. The log object 1271 may persist raw event data. In many embodiments, the raw event data receives an order 1272 that identifies the order in which the raw data arrives at the log in relation to other raw event data that arrives at the log. The log object 1271 encompasses the order 1272 and the raw event data as data 1273. In several embodiments, a cryptographic hash such as SHA-1 encrypts the content of the log object 1271.

The data 1273 may include a timestamp to identify a time of the occurrence of the event, a hash of the raw event data to uniquely identify the raw event data, a context to describe the event, and possibly other data. For example, an event may involve the purchase of shares of a stock. The raw event data may include a timestamp to indicate that time at which the transaction settled, a price of a share of the stock at the time of settlement of the transaction, an entity that placed the order, an entity that fulfilled the order, the number of shares of the stock that transferred at the settlement, the funds transferred at settlement, the entity that transferred the funds, the entity that received the funds, and/or the like. The hash of the raw event data may operate as a pointer to uniquely identify the log object 1271 for the purposes of generation of report, databases, and/or the like by the translation layer(s) 1230 and the services layer(s) such as the translation layer(s) 12030 and the services layer(s) 1220 depicted in FIG. 12A.

FIG. 12D illustrates an embodiment of a database objects 1280 such as the database object(s) 1250 in FIG. 12A for a persistent database. The database objects 1280 may persist derived data such as computed data, summarized data, corrected data, and canceled data. The database objects 1280 may comprise a first database 1281, or child table, coupled with a second database 1282, or parent table, via a relation such as a foreign key relation. In the context of relational databases, a foreign key is a field (or collection of fields) in one table that uniquely identifies a row of another table or the same table. In other words, the foreign key is defined in a second table, but it refers to the primary key or a unique key in the first table. For example, a table called Corrections and Cancelations has a primary key called correction_id. Another table called Correction and Cancelation Details has a foreign key which references correction_id to uniquely identify the relationship between both tables.

The table containing the foreign key is called the child table, and the table containing the candidate key is called the referenced or parent table. In database relational modeling and implementation, a unique key is a set of zero or more attributes, the value(s) of which are guaranteed to be unique for each tuple (row) in a relation. Note that the database system 1200 in FIG. 12A can implement the database objects 1280 in other database structures and are not limited to a relational database.

In some embodiments, the number of instances of the first database 1281 may differ and may be less than the number of instances of the second database 1282. The first database may include an original creator identifier (ID) (Kid) 1283, a timestamp 1284, queries 1285, and possibly other fields. The original creator ID 1283 may refer to the creator of an original record that resides in a log object such as the log object 1271 in the persistent log or immutable log. The timestamp 1284 may be a pointer to a timestamp in the log object that refers to the time of creation of the raw event data and the queries 1285 may include one or more columns that include indices or pointers for data in the log object or other database objects 1280. For example, the log object may include a raw data event that describes a current holding of stock shares, a buy of stock shares, a sell of stock shares, a correction of raw event data, a cancelation of raw event data, and/or the like. The database objects 1280 may create a corrections table to identify corrections in the persistent log and perform the corrections in the database objects 1280. Thereafter, the reports or other queries related to the stock holdings can find the corrections data in the database object 1280 and avoid having to perform the incorrect or canceled trades included in the log.

The second database 1282 may provide details related to raw event data in a log such as a correction associated with the raw event data or derived data based on the raw event data. The second database 1282 may include a deleter ID (Did) 1290, a corrector ID (Cid) 1291, data (1392), and possibly other fields. The deleter ID 1290 may include an index for an event that deletes or cancels an event in the raw event data of the log. The corrector ID 1291 may include an index for the event that changes or corrects the raw event data of the log or adds derived data related to the raw event data and the data 1292 may include data that is the corrected data or derived data associated with the log object. Many embodiments may include corrections and cancelations that result from, e.g., the differences in time between a trade and settlement of that trade.

Figure 13:
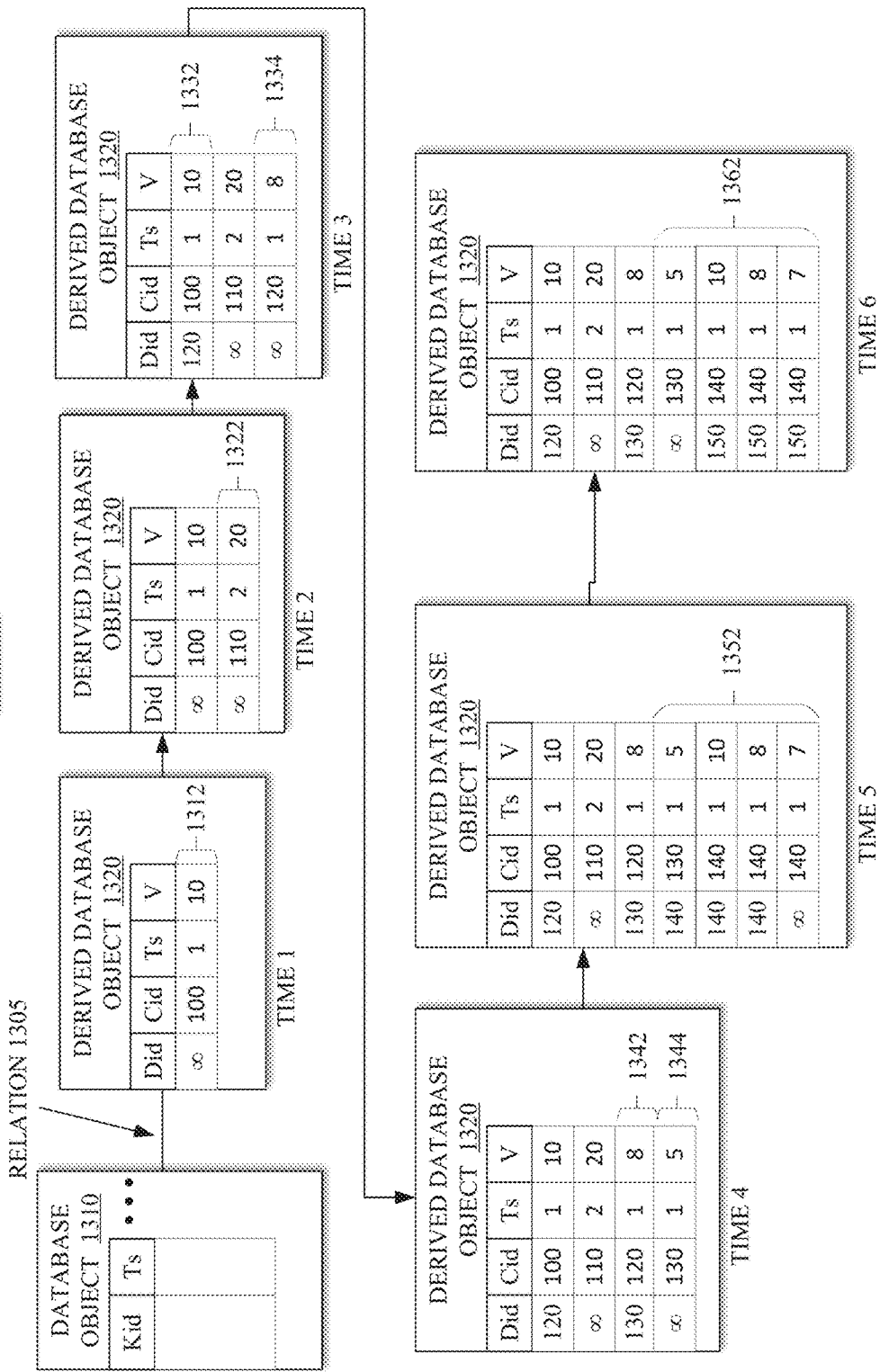
FIG. 13 depicts an embodiment of changes to a derived database object over time periods.

FIG. 13 illustrates an embodiment 1300 of a corrections and cancelations table in a database object such as the database objects 1280 depicted in FIG. 12D and how the table changes over a period of time from time 1 through time 6. The database object 1310 describes the first database 1381 that includes a relation 1305 such as a foreign key relation to a derived database object 1320 at time 1 such as the second database 1282 illustrated in FIG. 12D. The derived database 1320 may maintain corrections and cancelations for a specific stock of a specific fund such as a mutual fund. The corrections and cancelations table 1320 may track the cancelations and corrections for this stock and fund because the process of trading stock by this fund may involve corrections and cancelations over periods of time that have an impact on one or more financial aspects of the fund such as tax liabilities, net asset values (NAVs), and/or the like.

At time 1, the derived database object 1320 may include a first-row entry 1312 that indicates that the trade is still valid because the deleter id (Did) is set to infinity, the creator ID (Cid) is an event number 100, the timestamp (Ts) of the event is 1 and the trade (V) is a buy of 10 shares of the stock. At the time 2, a second-row entry 1322 is added to the derived database object 1320 to indicate that the trade is still valid because the deleter id (Did) is set to infinity, the creator ID (Cid) is an event number 110, the timestamp (Ts) of the event is 2 and the trade (V) is a buy of 20 shares of the stock.

Event 120 performs a correction at time 3. In particular, at the time 3, the first-row entry 1332 is modified in the derived database object 1320 to indicate that the trade is not valid as of the event 120 because the deleter id (Did) is changed from infinity to the event 120. A third-row entry 1334 is added to the derived database object 1320 to indicate that the trade is still valid because the deleter id (Did) is set to infinity, the creator ID (Cid) is the event number 120 that is the same event that canceled the trade in the first-row entry 1332, the timestamp (Ts) of the event is 1, and the trade (V) is a buy of 8 shares of the stock. Note that setting the timestamp (Ts) to 1 indicates that the added trade replaces the original trade, which was canceled, at the time associated with Ts equal to 1.

Time 4 illustrates another embodiment of a cancelation and correction. The event 130 cancels the trade from the event 120 by amending the deleter ID in the third row entry 1342 to include the event number 130 and by adding a fourth row entry 1344 to the derived database object 1320 to indicate that the trade is still valid because the deleter id (Did) is set to infinity, the creator ID (Cid) is an event number 130, the timestamp (Ts) of the event is 1 and the trade (V) is a buy of 5 shares of the stock. Again, setting the Ts equal to 1 indicates that this trade is the replacement trade for the trade that previously occurred at the time Ts equal to 1.

Time 5 illustrates an embodiment of to reintroduce a succession of canceled events and to cancel those events while introducing a new event to replace the event at the time of Ts equal to 1 via cancelation of the fourth row and addition of the fifth, sixth, and seventh rows 1352. The event 140 cancels the fourth row by inclusion of the event number 140 in the delete ID field. The event 140 also adds the fifth and sixth rows but also deletes these rows by inclusion of the event number 140 in the delete ID fields. In particular, the fifth row reintroduces and cancels the buy of 10 shares at the time Ts equal to 1 and the sixth row reintroduces and cancels the buy of 8 shares at the time Ts equal to 1. The event adds the trade at the seventh row with the indication that the trade is still valid because the deleter id (Did) is set to infinity, the creator ID (Cid) is an event number 140, the timestamp (Ts) of the event is 1, and the trade (V) is a buy of 7 shares of the stock.

Time 6 illustrates an embodiment of an undelete function in the derived database object 1320 at the fourth, fifth, sixth, and seventh rows 1362. At the fourth row, the event 150 undeletes the trade by event 130 by changing the delete ID in the fourth row from event 140 to infinity. The event 150 also cancels or reconfirms the deletion of the trades in the fifth and sixth rows by changing the delete IDs in the fifth and sixth rows from event 140 to 150. Then, at the seventh row in the derived database object 1320 at time 6, the event 150 changes the delete ID from infinity to event 150 to cancel the trade of buying 7 shares of the stock.

In several embodiments, database objects such as the derived database object 1320 may include ladders to describe a jump from, e.g., time 1 to time 6, to avoid repetitions of calculations involved with making corrections and calculations over a period of time. If, for instance, a consumer such the consumer(s) 1224 in FIG. 12A does not need to know the detail of the corrections that occurred between time 1 and time 6, the ladder may provide a record that describes indicates a ladder from time 1 to time 6 and indicates the resulting buy of shares for that time period. In such embodiments, the ladder may only be valid for calculations or reports that begin on or after the time 6 because the corrections and calculations could have affected values of other trades or other financial information during the period of time between times 1 and 6.

Figure 14:
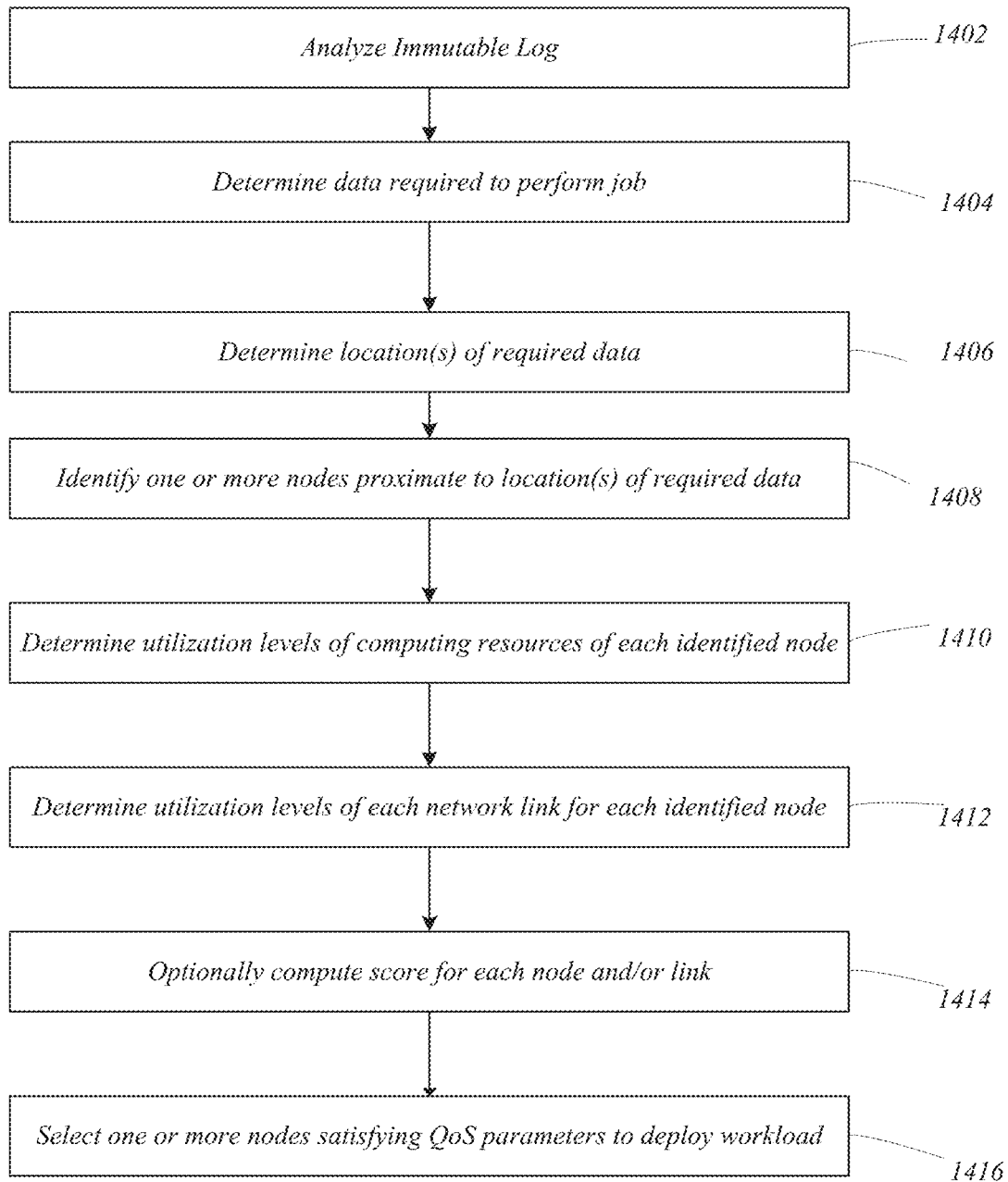
FIG. 14 illustrates an embodiment of a third logic flow.

FIG. 14 illustrates an example of a processing flow 1400 that may be representative of some or all the operations executed by one or more embodiments described herein. For example, the processing flow 1400 may illustrate operations performed by the controller 309 to schedule one or more workloads for processing on a cloud-based distributed system. However, embodiments are not limited in this manner, and one or more other components may perform operations to enable and support the operations discussed in this processing flow 1400.

As shown, at block 1402, the controller 309 may analyze an immutable log 310 for a transaction. As stated, one or more entries of the immutable log 310 may specify an account identifier, asset identifier (e.g., a stock ticker), a transaction type, and any other parameter for the transaction. For example, the immutable log 310 may specify to purchase a specified amount of a stock. At block 1404, the controller 309 may determine one or more data elements required to process the transaction. For example, the controller 309 may determine that information describing the account and/or the stock is needed to process the transaction. At block 1310, the controller 309 may determine the locations of the data elements determined at block 1404. For example, the account information may be stored on a first compute node, while the current price of the stock is located on a second compute node.

At block 1408, the controller 309 may identify one or more compute nodes proximate to the determined locations of the data. For example, the controller 309 may identify the first compute node, the second compute node, and a plurality of other compute nodes within a predefined distance (e.g., a number of network hops) of the first and/or second compute nodes. At block 1410, the controller 309 may determine the utilization levels of each resource (e.g., CPU, RAM, storage I/O, network I/O, etc.) of the compute nodes identified at block 1408. The controller 309 may further estimate an amount of time the compute node may require to process the workload (and/or a portion thereof). At block 1412, the controller 309 may determine the utilization levels of each network link to the fabric 302 for the compute nodes identified at block 1408. The controller 309 may further determine other attributes of each network link, such as latency, jitter, etc. At block 1414, the controller 309 may compute a score for each node identified at block 1408. For example, using the log 310, the controller 309 may compute a score reflecting the suitability of each node identified at block 1408 to process the workload in accordance with the QoS parameters of the SLA for the requesting client.

At block 1416, the controller 309 selects one or more nodes identified at block 1408 that satisfy the QoS parameters. For example, the controller 309 may select a predefined number of nodes having the highest scores computed at block 1414. In addition and/or alternatively, the controller 309 may select the nodes having the closest proximity to the data needed to process the transaction. In addition and/or alternatively, the controller 309 may select the nodes having the lowest resource utilization levels. In addition and/or alternatively, the controller 309 may select the nodes having the lowest network link utilization levels. In addition and/or alternatively, the controller 309 may select the nodes having the greatest number of network links to the needed data. In addition and/or alternatively, the controller 309 may select the least recently used nodes. In addition and/or alternatively, the controller 309 may select the compute nodes determined to process the workload (and/or one or more portions thereof) in the least amount of time (and/or within amounts of time specified in the SLA). Once selected, the controller 309 may deploy the workload (and/or one or more portions thereof) to each node selected by the controller 309 to process the workload.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the preceding Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "including" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method for guaranteed quality of service (QoS) in cloud computing environments, comprising:
receiving, by a cloud controller, a workload related to a first transaction of multiple transactions described in entries of an immutable log, for processing by at least one compute node of a plurality of compute nodes communicably coupled by a fabric in a cloud computing environment, the immutable log to comprise a persistent log that allows entries to be written but not deleted or changed;
accessing at least one of the entries of the immutable log to access data associated with the first transaction;
determining the data from the at least one entries of the immutable log, the data to describe the information to process for the first transaction, wherein the data specifies an account identifier, an asset, and a transaction type for trading the asset;
determining, based on the data associated with the first transaction, that a first compute node stores at least one data element required to process the first transaction, wherein the at least one data element comprises a current price of the asset;
determining utilization levels of a plurality of computing resources of the first compute node and nodes proximate to the at least one data element;
determining utilization levels of a plurality of links connecting the first compute node to the fabric and the nodes proximate to the at least one data element;
determining a score, based on the utilization levels of the computing resources and the links, for the first compute node and each of the nodes proximate to the at least one data element, the scores reflecting a suitability of each node to process the workload in accordance with QoS parameters for a service level agreement (SLA), wherein the QoS parameters comprise: a latency, a jitter, a workload execution time, a throughput, and a bandwidth;
determining, based on at least the scores, that processing the workload on the first compute node satisfies one or more of the QoS parameters specified in the SLA;
selecting at least the first compute node to deploy the workload;
scheduling, by the cloud controller, the workload for processing on the first compute node based on the determination that processing the workload on the first compute node satisfies the one or more QoS parameters specified in the SLA; and processing the workload on the first compute node.

2. The method of claim 1, wherein the transaction type comprises one or more of buying the asset and selling the asset, wherein processing the transaction comprises one or more of estimating a trade settlement, estimating a net asset value, estimating a stock holding, estimating a stock value, estimating a mutual fund value, and estimating a commodity value.

3. The method of claim 1, further comprising:
receiving a second workload related to a second transaction described by the immutable log, wherein the first and second transactions are described by different entries in the immutable log;
determining, based on the immutable log describing, that the first compute node stores at least one data element required to process the second transaction;
determining utilization levels of the plurality of computing resources of the first compute node;
determining utilization levels of the plurality of links connecting the first compute node to the fabric;
determining, based on the utilization levels of the computing resources and the links of the first compute node, that processing the second workload on the first compute node violates the one or more QoS parameters of the SLA; and
refraining from scheduling the second workload on the first compute node.

4. The method of claim 3, further comprising:
identifying a second compute node of the plurality of compute nodes proximate to the first compute node;
determining utilization levels of a plurality of computing resources of the second compute node;
determining utilization levels of a plurality of links connecting the second compute node to the fabric;
determining, based on the utilization levels of the computing resources and the links of the second compute node, that processing the second workload on the second compute node satisfies the one or more QoS parameters of the SLA; and
scheduling the second workload on the second compute node.

5. The method of claim 1, further comprising:
prior to scheduling the workload for processing on the first compute node, dividing the workload into a plurality of units;
determining a grouping of at least two of the plurality of compute nodes, the at least two of the plurality of compute nodes comprising at least the first compute node and a second compute node proximate to the first compute node; and
determining utilization levels of the plurality of computing resources of each compute node in the grouping;
determining utilization levels of a plurality of links connecting each compute node in the grouping to the fabric;
determining, based on the utilization levels of the computing resources and the links of the compute nodes in the grouping, that scheduling the plurality of units of the workload to the compute nodes in the grouping satisfies the one or more QoS parameters of the SLA; and
scheduling the plurality of units of the workload to the compute nodes in the grouping.

6. A non-transitory computer-readable medium storing instructions for guaranteed quality of service (QoS) in cloud computing environments, executable by one or more processor circuits cause the one or more processor circuits to:
receive a workload, related to a first transaction of multiple transactions described in entries of an immutable log, for processing by at least one compute node of a plurality of compute nodes communicably coupled by a fabric in a cloud computing environment, the immutable log to comprise a persistent log that allows entries to be written but not deleted or changed;
access at least one of the entries of the immutable log to access data associated with the first transaction;
determine the data from the at least one entries of the immutable log, the data to describe the information to process for the first transaction, wherein the data specifies an account identifier, an asset, and a transaction type for trading the asset;
determine, based on the data associated with the first transaction, that a first compute node stores at least one data element required to process the first transaction, wherein the at least one data element comprises a current price of the asset;
determine utilization levels of a plurality of computing resources of the first compute node and nodes proximate to the at least one data element;
determine utilization levels of a plurality of links connecting the first compute node to the fabric and the nodes proximate to the at least one data element;
determine a score, based on the utilization levels of the computing resources and the links, for the first compute node and each of the nodes proximate to the at least one data element, the scores reflecting a suitability of each node to process the workload in accordance with QoS parameters for a service level agreement (SLA), wherein the QoS parameters comprise: a latency, a jitter, a workload execution time, a throughput, and a bandwidth;
determine, based on at least the scores, that processing the workload on the first compute node satisfies one or more of the QoS parameters specified in the SLA;
select at least the first compute node to deploy the workload; and
schedule the workload for processing on the first compute node based on the determination that processing the workload on the first compute node satisfies the one or more QoS parameters specified in the SLA; and
processing the workload on the first compute node.

7. The computer-readable medium of claim 6, wherein the transaction type comprises one or more of buying the asset and selling the asset, wherein processing the first transaction comprises one or more of estimating a trade settlement, estimating a net asset value, estimating a stock holding, estimating a stock value, estimating a mutual fund value, and estimating a commodity value.

8. The computer-readable medium of claim 6, the instructions executable by the one or more processor circuits to cause the one or more processor circuits to:
receive a second workload related to a second transaction described by the immutable log, wherein the first and second transactions are described by different entries in the immutable log;
determine, based on the immutable log describing, that the first compute node stores at least one data element required to process the second transaction;
determine utilization levels of the plurality of computing resources of the first compute node;

determine utilization levels of the plurality of links connecting the first compute node to the fabric;
determine, based on the utilization levels of the computing resources and the links of the first compute node, that processing the second workload on the first compute node violates the one or more QoS parameters of the SLA; and
refrain from scheduling the second workload on the first compute node.

9. The computer-readable medium of claim 8, the instructions executable by the one or more processor circuits to cause the one or more processor circuits to:
identify a second compute node of the plurality of compute nodes proximate to the first compute node;
determine utilization levels of a plurality of computing resources of the second compute node;
determine utilization levels of a plurality of links connecting the second compute node to the fabric;
determine, based on the utilization levels of the computing resources and the links of the second compute node, that processing the second workload on the second compute node satisfies the one or more QoS parameters of the SLA; and
schedule the second workload on the second compute node.

10. The computer-readable medium of claim 6, the instructions executable by the one or more processor circuits to cause the one or more processor circuits to:
prior to scheduling the workload for processing on the first compute node, divide the workload into a plurality of units;
determine a grouping of at least two of the plurality of compute nodes, the at least two of the plurality of compute nodes comprising at least the first compute node and a second compute node proximate to the first compute node; and
determine utilization levels of the plurality of computing resources of each compute node in the grouping;
determine utilization levels of a plurality of links connecting each compute node in the grouping to the fabric;
determine, based on the utilization levels of the computing resources and the links of the compute nodes in the grouping, that scheduling the plurality of units of the workload to the compute nodes in the grouping satisfies the one or more QoS parameters of the SLA; and
schedule the plurality of units of the workload to the compute nodes in the grouping.

11. An apparatus for guaranteed quality of service (QoS) in cloud computing environments, comprising:
one or more processor circuits; and
memory storing instructions executable by the processor circuit to cause the processor circuit to:
receive a workload, related to a first transaction of multiple transactions described in entries of an immutable log, for processing by at least one compute node of a plurality of compute nodes communicably coupled by a fabric in a cloud computing environment, the immutable log to comprise a persistent log that allows entries to be written but not deleted or changed;
access at least one of the entries of the immutable log to access data associated with the first transaction;
determine the data from the at least one entries of the immutable log, the data to describe the information to process for the first transaction, wherein the data specifies an account identifier, an asset, and a transaction type for trading the asset;
determine, based on the data associated with the first transaction that a first compute node stores at least one data element required to process the first transaction, wherein the at least one data element comprises a current price of the asset;
determine utilization levels of a plurality of computing resources of the first compute node and nodes proximate to the at least one data element;
determine utilization levels of a plurality of links connecting the first compute node to the fabric and the nodes proximate to the at least one data element;
determine a score, based on the utilization levels of the computing resources and the links, for the first compute node and each of the nodes proximate to the at least one data element, the scores reflecting a suitability of each node to process the workload in accordance with QoS parameters for a service level agreement (SLA), wherein the QoS parameters comprise: a latency, a jitter, a workload execution time, a throughput, and a bandwidth;
determine, based on at least the scores, that processing the workload on the first compute node satisfies one or more of the QoS parameters specified in a the SLA;
select at least the first compute node to deploy the workload;
schedule the workload to process on the first compute node based on the determination that the utilization levels of the computing resources and the links satisfy the one or more QoS parameters specified in the SLA; and
processing the workload on the first compute node.

12. The apparatus of claim 11, wherein the transaction type comprises one or more of a purchase of the asset and a sale of the asset, wherein the first compute node is to process the first transaction based on one or more of an estimated trade settlement, an estimated net asset value, an estimated stock holding, an estimated stock value, an estimated mutual fund value, and an estimated commodity value.

13. The apparatus of claim 11, the memory storing instructions executable by the one or more processor circuits to cause the one or more processor circuits to:
receive a second workload related to a second transaction described by the immutable log, wherein the first and second transactions are described by different entries in the immutable log;
determine, based on the immutable log describing, that the first compute node stores at least one data element required to process the second transaction;
determine utilization levels of the plurality of computing resources of the first compute node;
determine utilization levels of the plurality of links connecting the first compute node to the fabric;
determine that the utilization levels of the computing resources and the links of the first compute node violate the one or more QoS parameters of the SLA; and
refrain from scheduling the second workload on the first compute node.

14. The apparatus of claim 13, the memory storing instructions executable by the one or more processor circuits to cause the one or more processor circuits to:
identify a second compute node of the plurality of compute nodes proximate to the first compute node;

determine utilization levels of a plurality of computing resources of the second compute node;
determine utilization levels of a plurality of links connecting the second compute node to the fabric;
determine that the utilization levels of the computing resources and the links of the second compute node satisfy the one or more QoS parameters of the SLA; and
schedule the second workload on the second compute node.

15. The apparatus of claim 11, wherein the QoS parameters comprise: a latency, a jitter, a workload execution time, a throughput, and a bandwidth, the memory storing instructions executable by the one or more processor circuits to cause the one or more processor circuits to:
prior to scheduling the workload for processing on the first compute node, divide the workload into a plurality of units;
determine a grouping of at least two of the plurality of compute nodes, the at least two of the plurality of compute nodes to comprise at least the first compute node and a second compute node proximate to the first compute node; and
determine utilization levels of the plurality of computing resources of each compute node in the grouping;
determine utilization levels of a plurality of links connecting each compute node in the grouping to the fabric;
determine that the utilization levels of the computing resources and the links of the compute nodes in the grouping satisfy the one or more QoS parameters of the SLA; and
schedule the plurality of units of the workload to the compute nodes in the grouping.

* * * * *